United States Patent
Harada et al.

(10) Patent No.: US 10,362,192 B2
(45) Date of Patent: Jul. 23, 2019

(54) READING APPARATUS AND METHOD FOR CONTROLLING THE SAME

(71) Applicant: CANON KABUSHIKI KAISHA, Tokyo (JP)

(72) Inventors: Keiko Harada, Tokyo (JP); Nobutsune Kobayashi, Yokohama (JP); Kimihiko Fukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/653,268

(22) Filed: Jul. 18, 2017

(65) Prior Publication Data

US 2018/0035000 A1 Feb. 1, 2018

(30) Foreign Application Priority Data

Jul. 29, 2016 (JP) .................. 2016-150326

(51) Int. Cl.
  *H04N 1/10* (2006.01)
  *H04N 1/00* (2006.01)
  *H04N 1/21* (2006.01)
  *H04N 1/58* (2006.01)
  *H04N 1/46* (2006.01)

(52) U.S. Cl.
  CPC ....... *H04N 1/1061* (2013.01); *H04N 1/00803* (2013.01); *H04N 1/21* (2013.01); *H04N 1/46* (2013.01); *H04N 1/58* (2013.01)

(58) Field of Classification Search
  CPC .................................................. H04N 1/1061
  USPC ....................................................... 358/1.12
  See application file for complete search history.

(56) References Cited

U.S. PATENT DOCUMENTS

| 2006/0062615 | A1* | 3/2006 | Horio | G03G 15/602 |
| | | | | 399/374 |
| 2007/0273935 | A1* | 11/2007 | Ide | H04N 1/00681 |
| | | | | 358/474 |
| 2009/0201517 | A1* | 8/2009 | Soda | H04N 1/00342 |
| | | | | 358/1.9 |
| 2015/0281491 | A1* | 10/2015 | Sahara | H04N 1/00774 |
| | | | | 358/498 |
| 2016/0191741 | A1* | 6/2016 | Tsukimori | H04N 1/17 |
| | | | | 358/486 |
| 2016/0277622 | A1* | 9/2016 | Nagashima | H04N 1/02418 |

FOREIGN PATENT DOCUMENTS

JP 2003-46699 A 2/2003

* cited by examiner

*Primary Examiner* — Jacky X Zheng

(74) *Attorney, Agent, or Firm* — Canon USA Inc., IP Division

(57) ABSTRACT

A reading apparatus includes a reader that obtains image data by reading a reading target, a platen on which a document to be read by the reader located at a first position is set, a first member read by the reader located at the first position if there is no document on the platen, a second member read by the reader located at a second position, which is different from the first position, and a determination unit that performs a determination process for determining whether the document is set on the platen on the basis of a first output, which is obtained if the reader located at the first position reads the reading target, and a second output, which is obtained if the reader located at the second position reads the reading target.

17 Claims, 11 Drawing Sheets

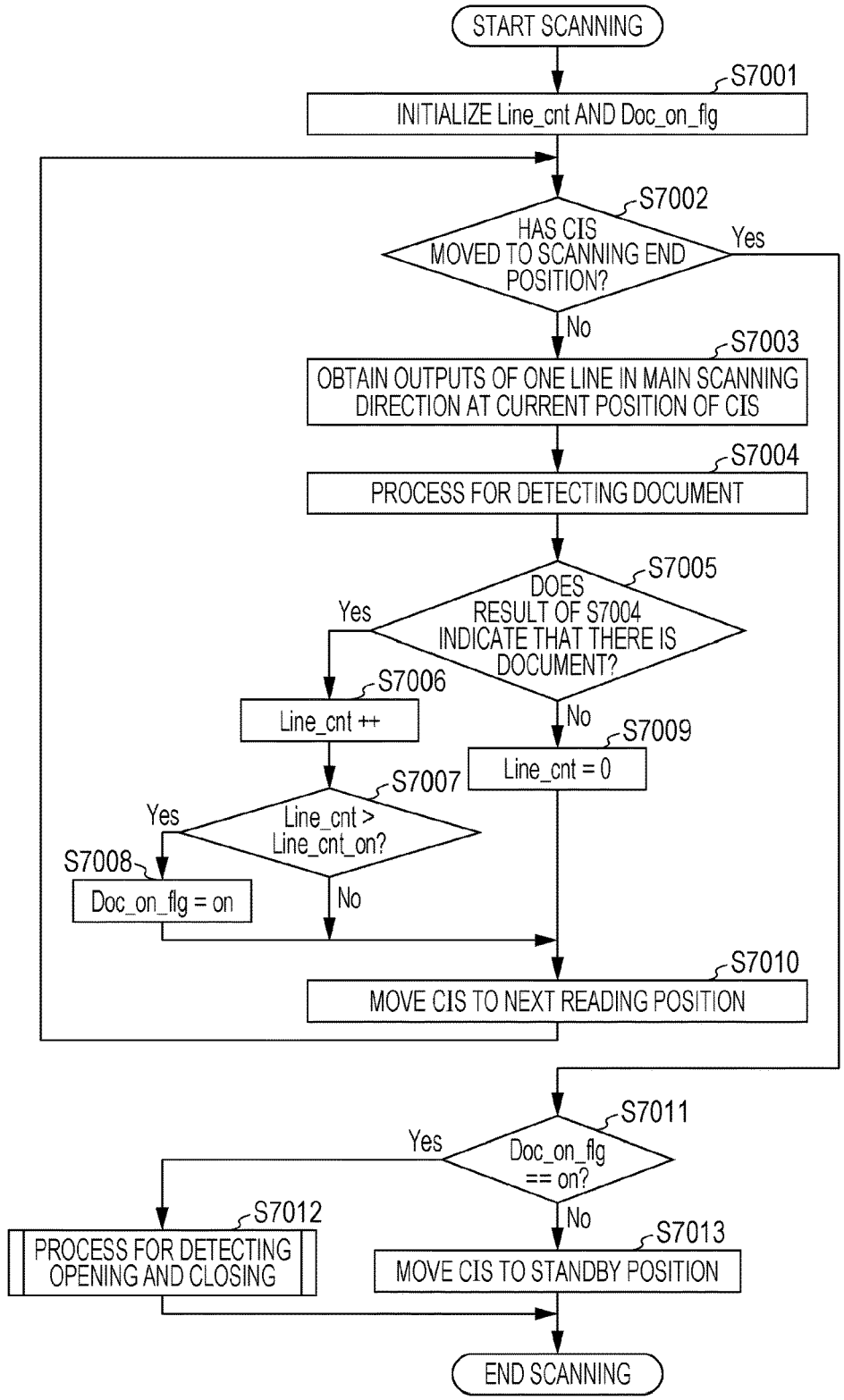

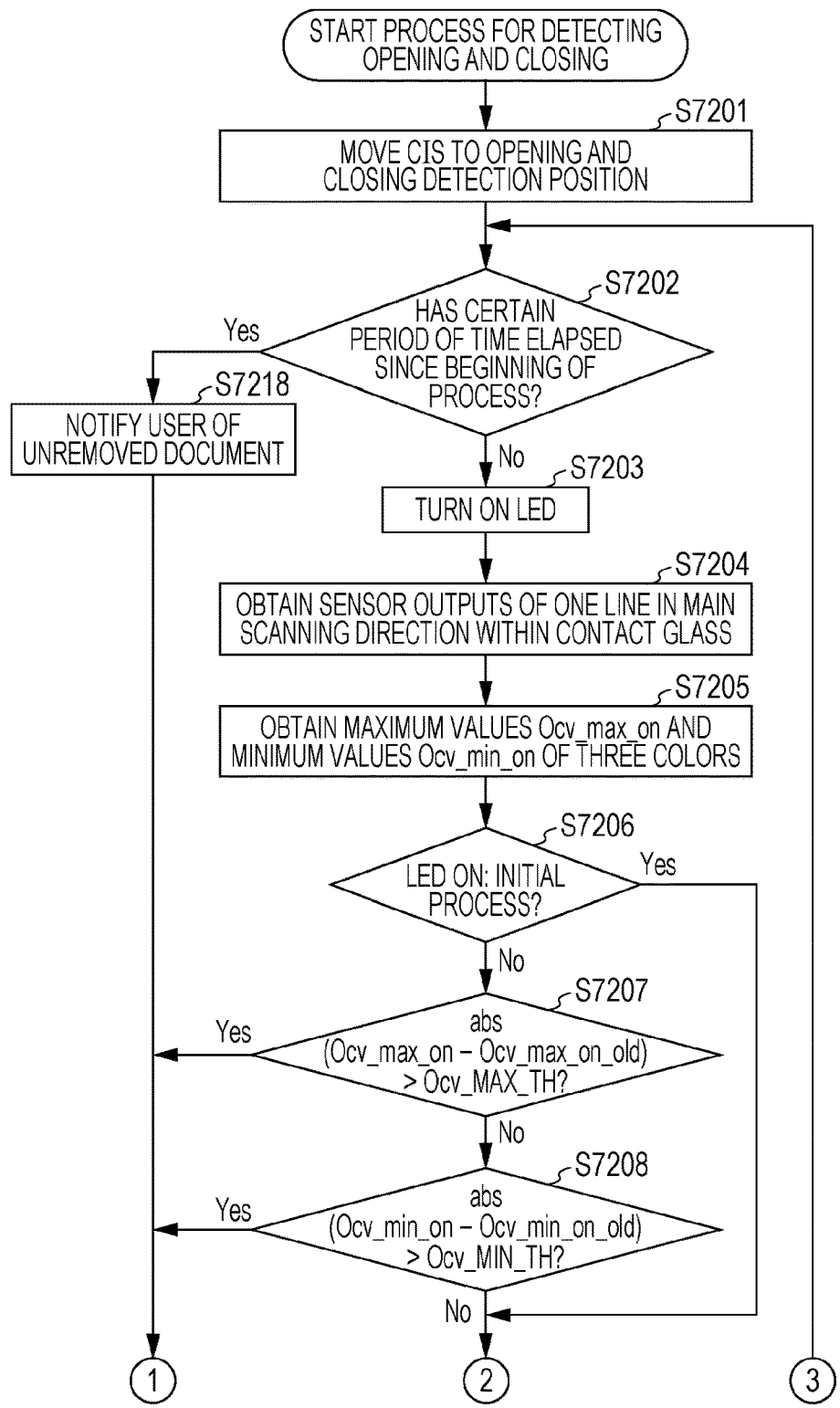

READING APPARATUS AND METHOD FOR CONTROLLING THE SAME

BACKGROUND OF THE INVENTION

Field of the Invention

The present invention relates to a reading apparatus and a method for controlling the reading apparatus.

Description of the Related Art

Reading apparatuses that read (scan) a document set on a platen and generate image data are known. If such a reading apparatus is used, a user might forget to remove a document set on a platen after making the reading apparatus read the document. In Japanese Patent Laid-Open No. 2003-46699, a technique for notifying the user of an unremoved document is described in which a document is read again after a certain period of time has elapsed since the document was read, and if obtained two pieces of data are the same, a touch panel notifies the user that he/she needs to remove the document.

In Japanese Patent Laid-Open No. 2003-46699, however, a case in which the reading apparatus has performed scanning even through no document is set on the platen, for example, is not taken into consideration. In Japanese Patent Laid-Open No. 2003-46699, therefore, the user might be notified of an unremoved document even when no document is set on the platen.

SUMMARY OF THE INVENTION

The present embodiment provides a reading apparatus and a method for controlling the reading apparatus capable of notifying the user of an unremoved document and, if no document is set on a platen, avoiding notifying the user of an unremoved document.

A reading apparatus in the present invention is a reading apparatus including a reader configured to obtain image data by reading a reading target, a platen on which a document is set to be read by the reader located at a first position, a first member read by the reader located at the first position if there is no document on the platen, a second member read by the reader located at a second position, which is different from the first position, an obtaining unit configured to obtain an output corresponding to the reading target if the reader reads the reading target, and a determination unit configured to perform a determination process for determining whether the document is set on the platen on the basis of a first output obtained if the reader located at the first position reads the reading target and a second output obtained if the reader located at the second position reads the reading target.

Further features of the present invention will become apparent from the following description of exemplary embodiments with reference to the attached drawings.

BRIEF DESCRIPTION OF THE DRAWINGS

FIGS. 7A to 7D are flowcharts illustrating a process for detecting an unremoved document performed by the reading apparatus according to the first embodiment.

DESCRIPTION OF THE EMBODIMENTS

Exemplary embodiments will be described hereinafter with reference to the drawings. It should be understood that the scope of the embodiments also includes modes obtained by modifying or improving the following embodiments by those skilled in the art on the basis of ordinary knowledge without deviating the spirit of the embodiments.

First Embodiment

An embodiment of a reading apparatus will be described. Although an inkjet multifunction peripheral (MFP) will be described as the reading apparatus in the present embodiment, a single-function peripheral (SFP) may be used, instead. In addition, embodiments of the reading apparatus need not have a printing function. It is sufficient that the reading apparatus at least has a reading function (scanning function) for reading a document and generating image data.

Figure 1A:
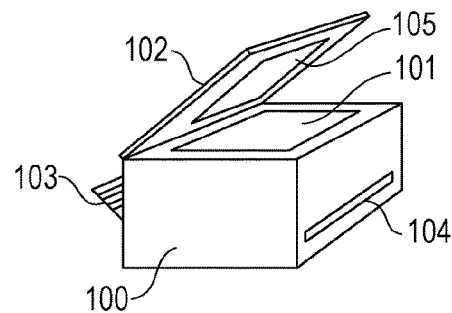
FIG. 1A is a diagram illustrating the appearance of a reading apparatus according to a first embodiment.

FIG. 1A is a diagram illustrating the appearance of an MFP 100, which is the reading apparatus according to the present embodiment. A platen 101 is a component on which a document to be scanned is set. An input port 103 is a unit from which a recording medium (sheets of paper or the like) to be subjected to printing is inserted. If the MFP 100 receives a printing command after a user sets a recording medium in the input port 103, the MFP 100 performs printing, and the recording medium (printout) to which a recording agent has been applied is output from an output port 104. If the MFP 100 receives a copying command after the user sets a document on the platen 101 and a recording medium in the input port 103, the MFP 100 scans the document set on the platen 101 and forms an obtained image on the recording medium.

Figure 2:
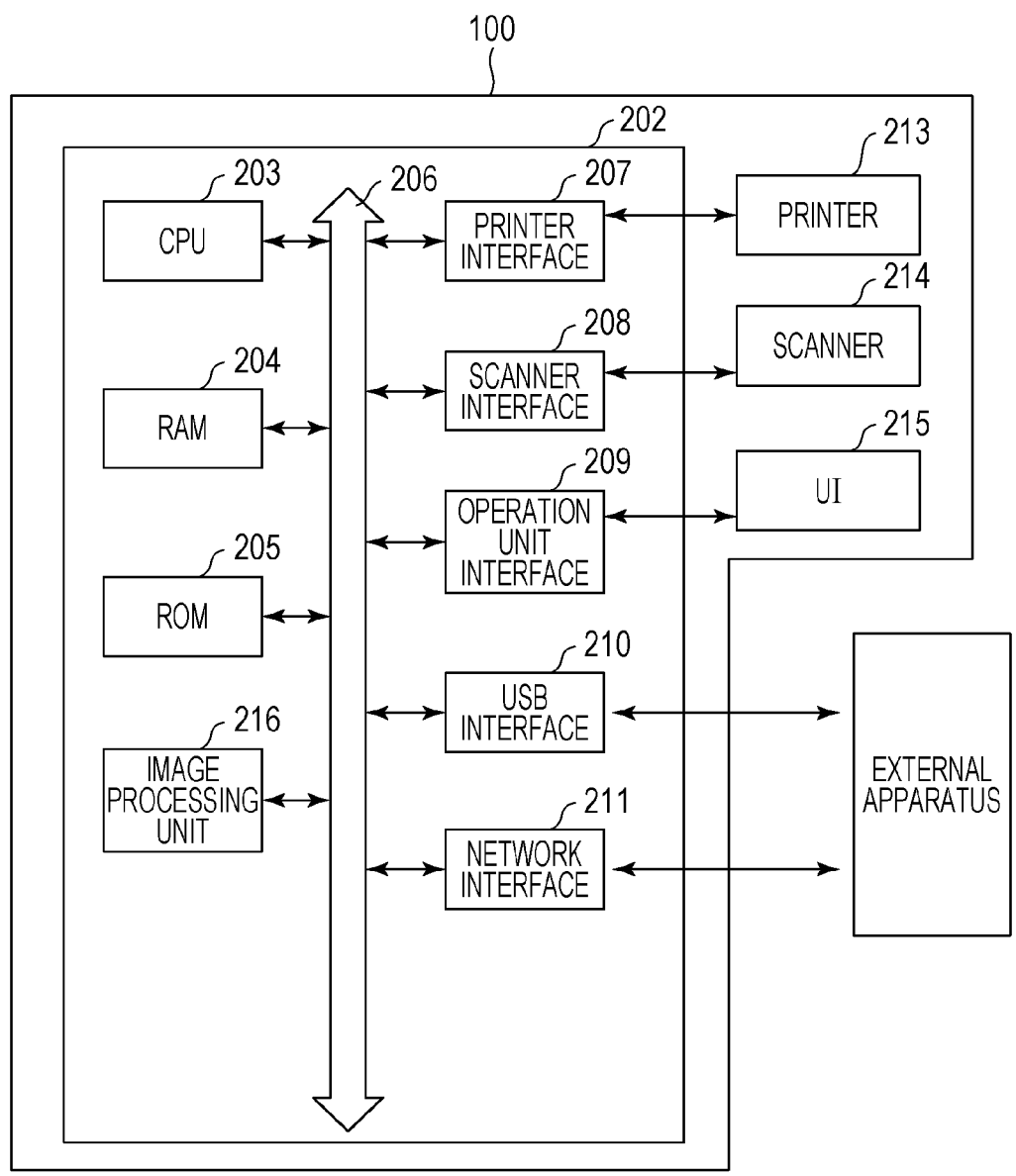
FIG. 2 is a block diagram illustrating the configuration of the reading apparatus according to the first embodiment.

FIG. 2 is a block diagram illustrating the hardware configuration of the MFP 100. A control unit 202 including a central processing unit (CPU) 203 controls the overall operation of the MFP 100.

The CPU 203 loads one of control programs stored in a read-only memory (ROM) 205 into a random-access memory (RAM) 204 and reads the control program as necessary to perform one of various types of control such as reading and printing. The RAM 204 is a main memory of the CPU 203 and used as a temporary storage area for loading various programs stored in a working area or the ROM 205.

The ROM 205 stores various programs such as the control programs to be executed by the CPU 203 and built-in operating system (OS) programs. In the present embodiment, the control programs stored in the ROM 205 are used to achieve various types of software control such as scheduling and task switching under the control of a built-in OS stored in the ROM 205. In addition, in the present embodiment, the ROM 205 stores image data, various programs, and various pieces of setting information. Although a flash storage or the like is assumed as the ROM 205 in the present embodiment, an auxiliary storage device such as a hard disk may be used, instead.

A printer interface 207 is an interface for connecting a printer 213 and the control unit 202 to each other. The control unit 202 transfers image data to the printer 213 through the printer interface 207. Upon receiving the image data, the printer 213 operates as a printing unit and prints an image according to the received image data on a recording medium such as a sheet of paper using a recording agent such as ink.

A scanner interface 208 is an interface for connecting a scanner 214 and the control unit 202 to each other. The scanner 214 reads a document set on the platen 101 to generate digital image data and transfers the generated image data to the RAM 204 through the scanner interface 208.

An operation unit interface 209 connects a user interface (UI) 215 and the control unit 202 to each other. The UI 215 includes a liquid crystal display having a touch panel function and operation keys. That is, the UI 215 functions as an operation unit that receives various operations from the user and a display unit that displays information for the user. Although an operation unit and a display unit are integrated as a single unit by including a touch panel in the UI 215 in the present embodiment, an operation unit and a display unit may be provided as separate units by including physical keys or the like in the operation unit, instead. In addition, the MFP 100 receives an operation performed by the user on the UI 215 to receive a printing command, a copying command, or a scanning command from the user. If the MFP 100 receives a printing command from the user through the UI 215, the MFP 100 performs printing on the basis of image data stored in a recording medium such as a secure digital (SD) card.

A universal serial bus (USB) interface 210 and a network interface 211 are interfaces for connecting the MFP 100 and external apparatuses to each other and controlling communication between the MFP 100 and the external apparatuses. If the USB interface 210 receives a scanning command (scanning job) from an external apparatus through a USB cable, for example, the USB interface 210 saves a signal corresponding to the command to the RAM 204. The CPU 203 reads the signal to cause the scanner 214 to perform scanning and temporarily saves image data obtained as a result of the scanning to the RAM 204. The image data saved to the RAM 204 is transferred to the external apparatus through the USB interface 210. The CPU 203 checks that the image data has been transferred to the external apparatus, and deletes the image data saved in the RAM 204. If all the image data has been transferred and deleted, the scanning specified by the external apparatus ends.

If an external apparatus issues a scanning command not through the USB cable but through a network, the same operation is performed through the network interface 211.

The MFP 100 can receive a scanning job not only from an external apparatus but also from a user operation through the operation unit interface 209.

An image processing unit 216 is used if image data obtained as a result of scanning requires image processing or correction or if image data received from an external apparatus along with a printing command (printing job) requires image processing. In addition, the image processing unit 216 is mainly used to perform, using a hardware function, image processing or correction that would take time if a control program loaded into the RAM 204 were used. An external apparatus refers to an apparatus capable of communicating with the reading apparatus, such as a mobile terminal, a personal computer (PC), a tablet terminal, a personal digital assistant (PDA), or a digital camera. The diagram illustrating the hardware configuration has been described.

Figure 4:
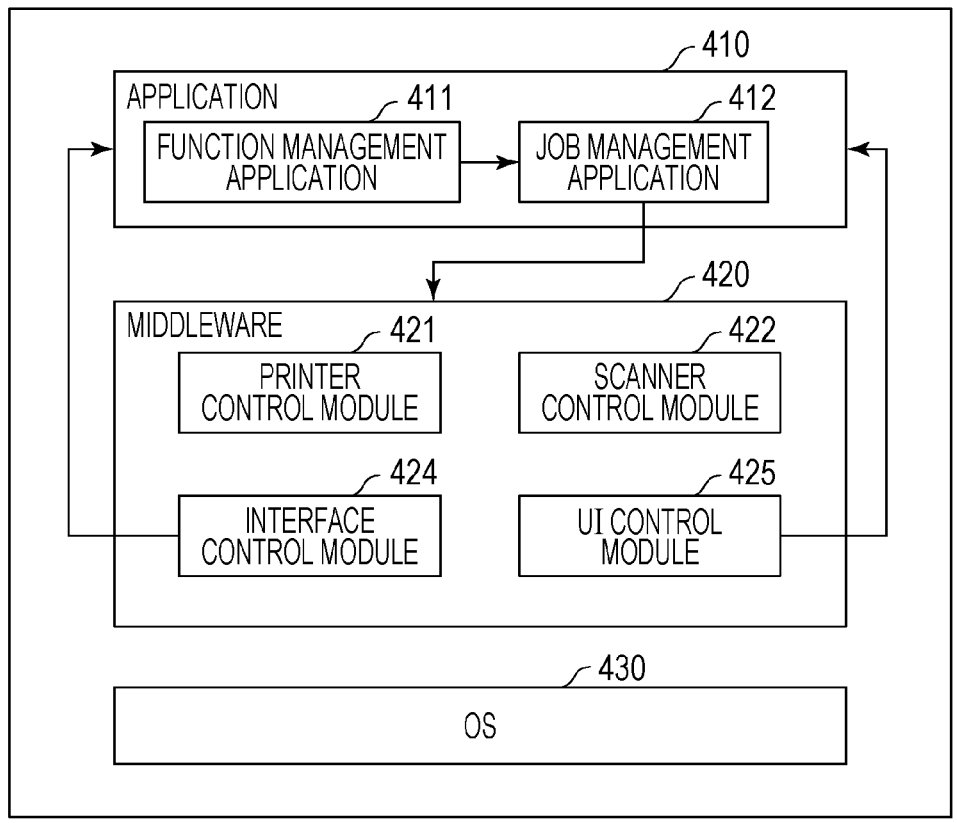
FIG. 4 is a diagram illustrating the software configuration of the reading apparatus according to the first embodiment.

Next, a diagram illustrating the software configuration of the MFP 100 will be described. FIG. 4 is a diagram illustrating the software configuration of control programs for controlling hardware modules loaded into the RAM 204. The control programs are roughly divided into three blocks, namely an application 410, middleware 420, and an OS 430. A process achieved by each piece of software is achieved by reading one of various programs, which are stored in a memory such as the ROM 205, corresponding to the piece of software onto the RAM 204 and executing the program using the CPU 203.

The OS 430 is software that provides basic functions for performing processes based on the control programs using the control unit 202. The middleware 420 includes pieces of software for controlling interfaces with the physical devices such as printer 213 and the scanner 214. In the present embodiment, the middleware 420 includes a printer control module 421 for controlling the printer interface 207 and a scanner control module 422 for controlling the scanner interface 208. The middleware 420 also includes an interface control module 424 for controlling the USB interface 210 and the network interface 211 and a UI control module 425 for controlling the operation unit interface 209. The application 410 includes pieces of software that operate the devices through the middleware 420 to achieve functions (a printing function, a copying function, a scanning function, and the like) that the MFP 100 provides for the user.

If the UI control module 425 detects a copying command input by the user through the UI 215 or the operation unit interface 209, for example, the UI control module 425 notifies the application 410 of the copying command. Upon receiving the notification, the application 410 executes a function management application 411 for performing copying. If performing copying, the function management application 411 issues a scanning job and a printing job and causes a job management application 412 to perform the jobs. The job management application 412 performs the scanning job first. More specifically, the job management application 412 uses the scanner control module 422 included in the middleware 420 to cause the scanner 214 to perform scanning and saves resultant image data to the RAM 204. If the job management application 412 saves the image data to the RAM 204, the image data might require image processing or correction. In this case, the scanner control module 422 performs necessary image processing or correction on the image data using the image processing unit 216. After the image data used for copying is saved to the RAM 204, the job management application 412 performs the printing job. More specifically, the job management application 412 uses the printer control module 421 included in the middleware 420 to cause the printer 213 to perform printing based on the image data saved in the RAM 204. The printer control module 421 transmits the image data saved in the RAM 204 to the printer interface 207. At this time, the printer control module 421 performs, using the image processing unit 216, image processing or correction as necessary on the image data to be transmitted. The functions to be provided by the MFP 100 are thus achieved by operating the modules together. The diagram illustrating the software configuration has been described.

Figure 1B:
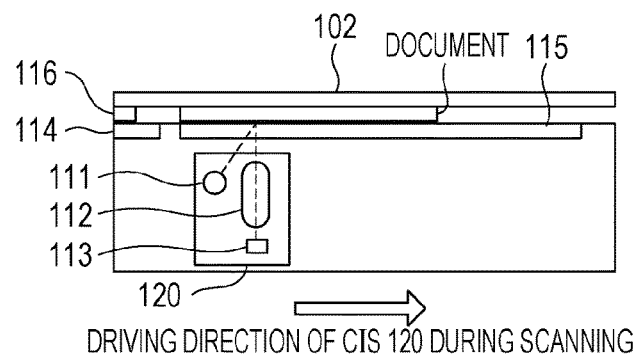
FIG. 1B is a cross-sectional view of a scanner included in the reading apparatus according to the first embodiment.

FIG. 1B is a cross-sectional view of the scanner 214. The platen 101 includes a contact glass 115 for keeping a scanner sensor and a document at a constant distance from each other and a component for holding the contact glass 115. The user can open a platen cover 102 around a hinge 116 provided for the platen 101 (rotate the platen cover 102 upward relative to the contact glass 115). The platen cover 102 can be closed to cover the contact glass 115 and opened to expose the contact glass 115. If the platen cover 102 is opened and the platen 101 is exposed, the user can set a document on the platen 101. If the platen cover 102 is closed, the platen cover 102 serves as a pressure plate that holds a document set on the contact glass 115 (platen 101). A white sheet 105 for protecting an image to be scanned is attached to a surface of the platen cover 102 that comes into contact with a document set on the contact glass 115. The surface that comes into contact with a document set on the contact glass 115 is, in other words, a surface that faces the platen 101 if the platen cover 102 is closed. The scanner 214 generates image data by reading a reading target (a document or the like) set between the platen cover 102 and the platen 101. If scanning is performed without a document set on the platen 101, for example, the white sheet 105 on the platen cover 102 comes into contact with the platen 101, and the scanner 214 reads the white sheet 105. In the present embodiment, the scanner 214 reads the reading target using a contact image sensor (CIS) 120. The scanner 214 includes the CIS 120 and a driving device that drives the CIS 120 in a direction substantially parallel to the contact glass 115. The configuration of the scanner 214 is not limited to this. For example, a known component such as a charge-coupled device (CCD) image sensor may be used for the scanner 214, instead.

If the scanner 214 receives a reading command from the scanner control module 422 through the scanner interface 208, the scanner 214 moves the CIS 120 under a white reference sheet 114 and creates output correction data regarding pixels using a sensor array 113. The white reference sheet 114 refers to a sheet used to obtain output values that serve as references in shading correction, which will be described later. The white reference sheet 114 may be of any shape and material insofar as the white reference sheet 114 is a member that can be used for this purpose (that is, a white reference member). Details of a method for creating the output correction data and a correction method will be described in the section of "Shading Correction". The scanner control module 422 transmits created correction data to the RAM 204. After the correction data is created, the scanner control module 422 turns on a light-emitting diode (LED) 111 and reads a document set on the contact glass 115 while moving the CIS 120.

Figure 11:
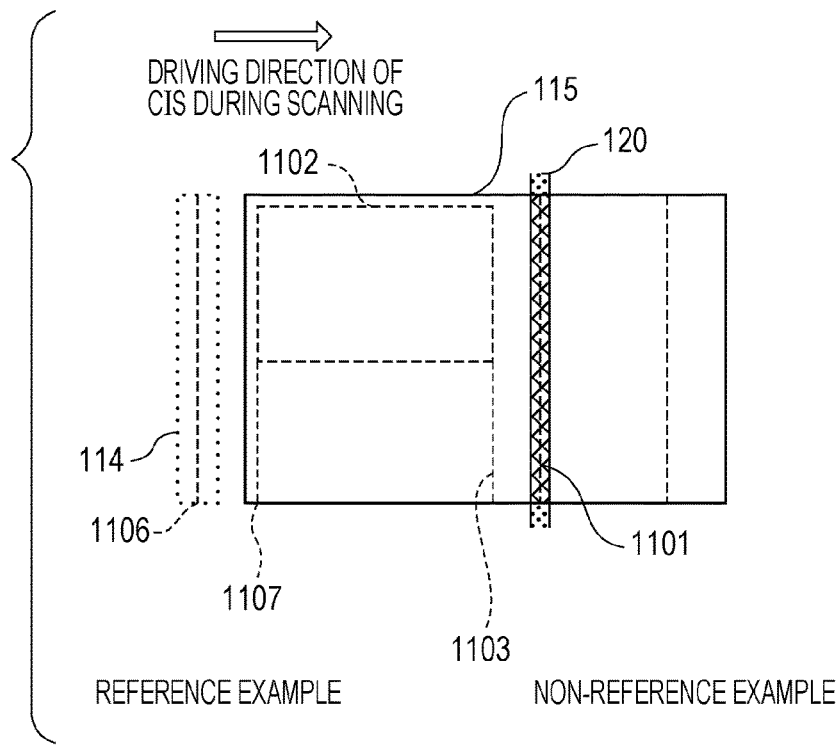
FIG. 11 is a plan view of the scanner included in the scanning apparatus according to the first embodiment.

The CIS 120 according to the present embodiment includes the sensor array 113, which is an array of image sensors for digitizing an image and obtaining an output. Light emitted from the LED 111 while the CIS 120 is moving is reflected from a document, and the reflected light goes to the sensor array 113 through a rod lens array 112. The light reflected from the document enters the sensor array 113, and an output for each color is obtained. The scanner control module 422 saves the output to the RAM 204. More specifically, the scanner control module 422 converts the reflected light into electrical signals using imaging devices and performs analog-to-digital (A/D) conversion on the electrical signals to output digital data. The scanner control module 422 changes the color of light emitted from the LED 111 from red (R) to green (G), and then to blue (B) to control light incident on the sensor array 113. Obtained outputs for these colors are then combined with one another. The scanner control module 422 generates image data using the outputs for the three colors of light, the output correction data saved in the RAM 204, and the image processing unit 216. In the present embodiment, if the sensor array 113 obtains outputs corresponding to a certain area, the sensor array 113 reads a document in the area and generates image data corresponding to the area. After the reading of the document set on the contact glass 115 and the generation of digital image data regarding the document are completed, the scanner control module 422 moves the CIS 120 to a standby position 1106. The standby position 1106 is a position at which the CIS 120 is located before scanning. FIG. 11 illustrates an example of the standby position 1106. Although the standby position 1106 is under the white reference sheet 114 in the present embodiment, the standby position 1106 may be any position. The MFP 100 can print an image based on image data by transferring image data generated by the scanner 214 in this manner to the printer 213. In addition, the MFP 100 can transmit the image data generated by the scanner 214 to an external apparatus using one of various transmission protocols. Furthermore, the MFP 100 can save the image data generated by the scanner 214 to a storage area readable and writable thereby.

Figure 5:
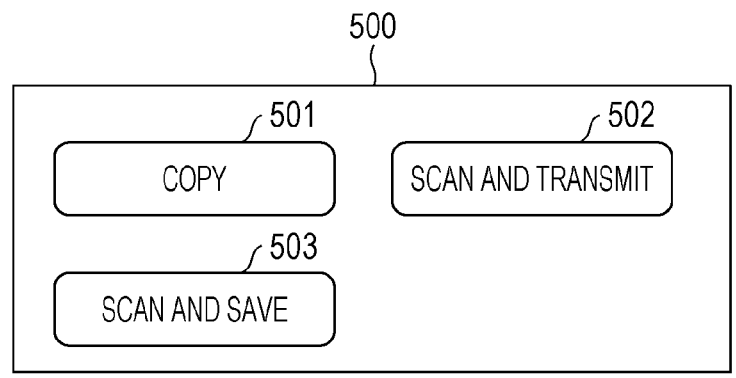
FIG. 5 illustrates an example of a setting screen for setting a process to be performed by the reading apparatus according to the first embodiment.

If the user turns on the MFP 100, a setting screen for setting a process to be performed by the MFP 100 is displayed on the UI 215. FIG. 5 is a diagram illustrating an example of the setting screen displayed on the UI 215. The user can specify a process to be performed by the MFP 100 by operating one of operation keys 501 to 503 in the setting screen illustrated in FIG. 5. The operation key 501 is used to cause the MFP 100 to perform copying. The operation key 502 is used to cause the MFP 100 to perform scanning and transmit image data obtained as a result of the scanning to an external apparatus. The operation key 503 is used to cause the MFP 100 to perform scanning and save image data obtained as a result of the scanning to a storage area included in the MFP 100. The setting screen may also include another key for causing the MFP 100 to perform another process. For example, the setting screen may include a key for changing settings (network settings, printing settings, or the like) of the MFP 100. Although FIG. 5 illustrates "copy", "scan and transmit", and "scan and save" as functions, the MFP 100 may have different functions, instead. A process for detecting an unremoved document disclosed in the present embodiment is performed, for example, after one of the above functions is performed or after a scanning job or a copying job is received from an external apparatus.

The process for detecting an unremoved document disclosed in the present embodiment will be described hereinafter. In the present embodiment, the process for detecting an unremoved document includes a process for detecting a document, in which whether there is a document on the platen 101 is determined during scanning, a process for detecting opening and closing, in which opening and closing of the platen cover 102 after scanning are detected, and a notification process, in which the user is notified of an unremoved document. In the present embodiment, it is possible to avoid performing the notification process if there is no document by determining whether to perform the process for detecting opening and closing and the notification process in accordance with a result of the process for detecting a document. In addition, in the present embodiment, whether there is a document on the platen 101 can be determined without repeating scanning by performing the process for detecting a document through a comparison between output values obtained while shading correction data is being obtained and output values obtained during scanning. Details of these processes will be described later.

Shading Correction

Figure 1C:
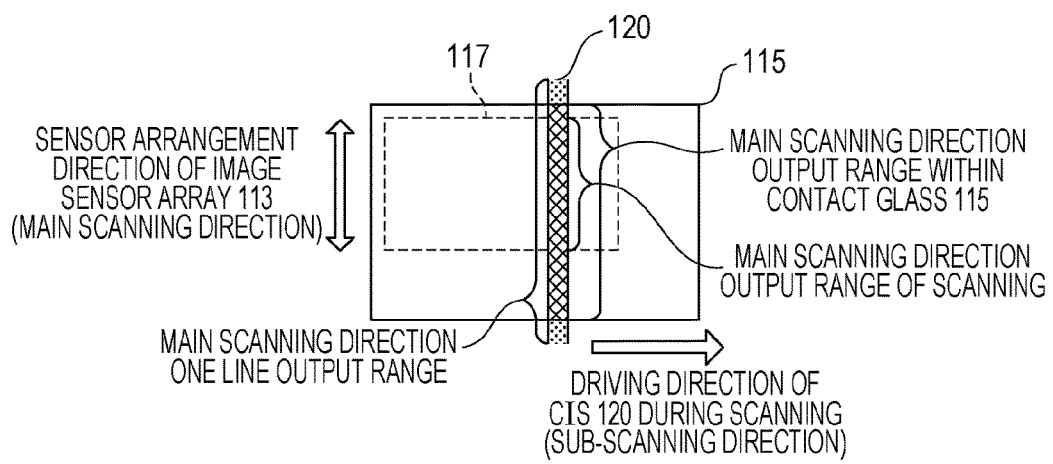
FIG. 1C is a plan view of a scanner included in the reading apparatus according to the first embodiment.

FIG. 1C is a plan view of the scanner 214. Because FIG. 1C is a schematic diagram illustrating a moment in which the scanner 214 is performing scanning, the CIS 120 is not located at the standby position but in a scanning route. In the present embodiment, the sensor array 113 includes sensors arranged in one dimension capable of receiving light emitted from the LED 111 and reflected from a document, performing photoelectric conversion on the reflected light, and outputting the light as currents. In the present embodiment, a "main scanning direction of the sensors" refers to a direction in which the sensors are arranged. In other words, the "main scanning direction of the sensors" refers to a direction substantially perpendicular to a direction in which the CIS 120 moves during scanning.

In the present embodiment, results of A/D conversion performed on outputs of the sensors included in the sensor array 113 in order of the positions of the sensors will be referred to as "outputs of one line in the main scanning direction". FIG. 1C illustrates a range of the outputs of one line in the main scanning direction. If resolution specified by the job management application 412 is 300 dpi, a maximum value and a minimum value of the outputs of each sensor are 65,535 and 0, respectively. If the sensor array 113 includes 2,592 sensors and the outputs of each sensor are subjected to A/D conversion with 16 bits, the "outputs of one line in the main scanning direction" are 2,592 outputs (digital data) obtained from the sensors. The number of "outputs of one line in the main scanning direction", however, varies depending on the resolution specified by the job management application 412 and the number of sensors included in the sensor array 113. If the resolution specified by the job management application 412 is 150 dpi, for example, the scanner control module 422 obtains 1,296 pieces of digital data by averaging outputs of adjacent sensors.

Next, a "range of outputs in the main scanning direction within the contact glass 115" will be described. FIG. 1C illustrates the range. In most cases, the sensor array 113 is longer than the contact glass 115 in the main scanning direction. Ends of the sensor array 113, therefore, do not face the contact glass 115 but face members outside the contact glass 115 that do not transmit light. Outputs of sensors arranged in portions of the sensor array 113 that face the members that do not transmit light are hardly affected by a state of a document set on the platen 101 or a state of the platen cover 102. This is because light emitted from the LED 111 is absorbed by the members that do not transmit light and these sensors do not receive reflected light. It is therefore difficult to detect the state of a document set on the platen 101 or the state of the platen cover 102 from the outputs of the sensors arranged in the portions of the sensor array 113 that face the members that do not transmit light. In the present embodiment, outputs of sensors in the "range of outputs in the main scanning direction within the contact glass 115", which is a range other than the portions of the sensor array 113 that face the members that do not transmit light, are used for various determinations.

Lastly, a "range of outputs in the main scanning direction in scanning" will be described. FIG. 1C illustrates the range. If the MFP 100 performs a scanning job, the scanner control module 422 receives a scanning target range 117 specified by the job management application 412. A scanning job includes, for example, setting information regarding the scanning target range 117. If the setting information indicates A4, the scanning target range 117 corresponds to the size of A4.

The scanner control module 422 then determines on the basis of the setting information included in the scanning job which sensors are to be used in the sensor array 113. More specifically, the scanner control module 422 determines that sensors arranged in a portion of the sensor array 113 corresponding to the length and position of the scanning target range 117 in the main scanning direction are to be used. The scanner control module 422 thus sets the sensor array 113 such that outputs in the scanning target range 117 can be obtained. At this time, sensors other than the sensors to be used may be deactivated, or only outputs of the sensors to be used may be used after outputs of all the sensors are obtained. The scanner control module 422 then specifies a range in which the CIS 120 is moved in a sub-scanning direction during scanning (scanning range) on the basis of the setting information included in the scanning job. More specifically, the scanner control module 422 determines that the CIS 120 is to be moved over a distance corresponding to the length of the scanning target range 117 in the sub-scanning direction so that outputs in the scanning target range 117 can be obtained.

Next, how parameters used for the process for detecting an unremoved document are obtained during scanning (during obtaining of outputs by the sensor array 113) will be described.

Figure 6A:
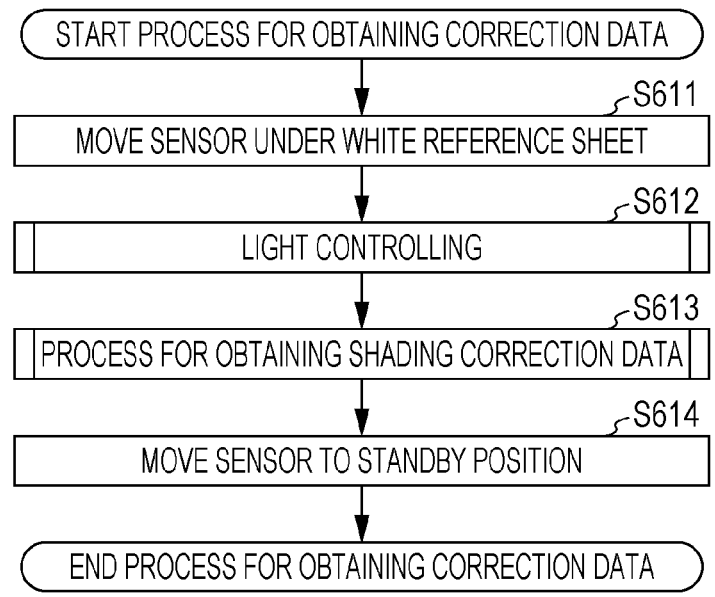
FIGS. 6A to 6C are flowcharts illustrating shading correction performed by the reading apparatus according to the first embodiment.
Figure 6B:
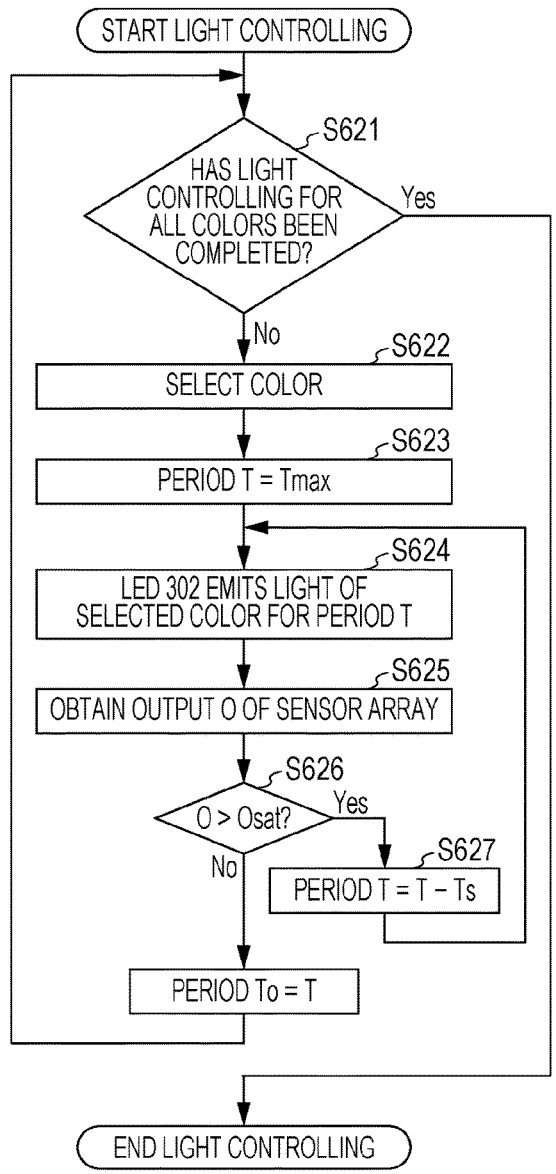
Figure 6C:
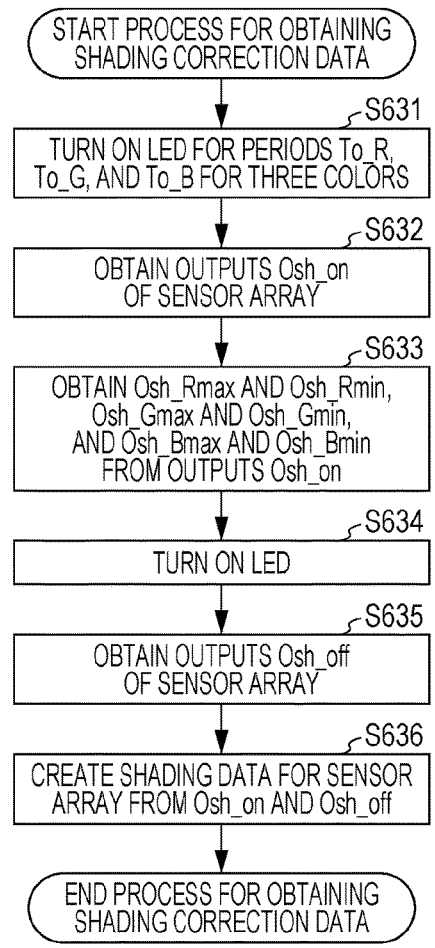

FIGS. 6A to 6C are flowcharts illustrating shading correction performed by the scanner control module 422 using the white reference sheet 114. Differences between original outputs of the sensors and actual outputs of the sensors are generally called "shading". A process for correcting the shading of the sensors is called "shading correction". Data used for the shading correction will be referred to as "shading correction data" hereinafter.

FIG. 6A is a flowchart illustrating the shading correction performed by the MFP 100. The shading correction illustrated in the flowchart of FIG. 6A is achieved, for example, by reading a program stored in the ROM 205 or the like to the RAM 204 and executing the program using the CPU 203. A timing at which the shading correction is performed is not particularly limited. For example, the shading correction may be invariably performed before scanning, or may be performed at certain time intervals. Alternatively, the shading correction may be performed after the MFP 100 is turned on or if a significant error has occurred in the outputs of the sensors. Whether a significant error has occurred in the outputs of the sensors can be determined by regularly obtaining the outputs of the sensors under the same conditions and detecting a timing at which a significant error has occurred in the obtained outputs.

In S611, the CPU 203 causes a motor control unit, which is not illustrated, to drive a motor to move the CIS 120 under the white reference sheet 114. In the following description, the CIS 120 is always moved by the motor driven by the motor control unit.

Next, the CPU 203 controls the LED 111 and determines periods for which light in wavelength bands of R, G, and B is emitted during scanning (S612). This step will be referred to as "light controlling".

FIG. 6B is a flowchart illustrating the light controlling performed by the MFP 100. The light controlling illustrated in the flowchart of FIG. 6B is achieved, for example, by reading a program stored in the ROM 205 or the like to the RAM 204 and executing the program using the CPU 203. The flowchart of FIG. 6B corresponds to S612.

In S621, the CPU 203 determines whether light controlling for all the colors of the LED 111, namely R, G, and B, has been completed. If light controlling for all the colors has been completed, the CPU 203 ends the light controlling and performs S612. If light controlling for all the colors has not been completed, the CPU 203 performs S622.

In S622, the CPU 203 selects one of the colors of the LED 111, namely R, G, and B, and performs light controlling for the selected color. In the present embodiment, the CPU 203 performs light controlling for R first.

In S623, the CPU 203 sets a period T for which the LED 111 turns on with the color selected in S622 to a maximum value Tmax.

In S624, the CPU 203 turns on the LED 111 with the color selected in S622 for the period T. Light of the color reflected from the white reference sheet 114 enters the sensor array 113 and is output from the sensors included in the sensor array 113 as analog electrical signals. These outputs are input to an A/D conversion circuit and converted into digital data. In S625, the CPU 203 obtains an output O, which is a value obtained as a result of the conversion of the light of the color reflected from the white reference sheet 114 into the digital data through the sensor array 113.

If the period T of the LED 111 is too long for the sensitivity of the sensor array 113, the output O of the sensor array 113 is undesirably saturated. That is, the output O undesirably reaches the maximum value (65,535 if the resolution is 300 dpi). In S626, therefore, the CPU 203 determines whether the output O is larger than a predetermined threshold Osat (Osat<maximum output value) to determine whether the output O is saturated. If the output O is saturated, the period T is too long for the sensitivity of the sensor array 113, and the CPU 203 proceeds to S627 to decrease the period T by Ts. The CPU 203 then returns to S624 to turn on the LED 111 for a newly set period. The CPU 203 obtains a new output O and determines whether the output O is saturated. The CPU 203 repeats this process and sets the period T such that the output O is not saturated. The CPU 203 performs this process for all the colors (R, G, and B) and obtains periods To_R, To_G, and To_B for which light of R, G, and B, respectively, is emitted. In the present embodiment, the output O obtained in S625 is a maximum value of the outputs of one line of the sensors in the main scanning direction. The maximum value is obtained by a maximum/minimum calculation circuit included in the scanner interface 208. Although the maximum value is obtained by a dedicated circuit in order to increase processing speed and reduce a processing load in the present embodiment, the outputs of one line of the sensors in the main scanning direction may be temporarily saved to a buffer and the maximum value may be found from the saved values, instead.

The light controlling has been described. The periods for which the light of the colors are emitted determined in the light controlling are used if the shading correction data is obtained and if the process for detecting opening and closing disclosed in the present embodiment is performed as well as in scanning. In doing so, it becomes possible to suppress an erroneous operation due to inappropriate periods for which the LED 111 is turned on in relation to the sensitivity of the sensors.

After the light controlling ends, the CPU 203, in S613, performs a process for obtaining shading correction data.

FIG. 6C is a flowchart illustrating the process for obtaining shading correction data performed by the MFP 100. The process illustrated in the flowchart of FIG. 6C is achieved, for example, by reading a program stored in the ROM 205 or the like to the RAM 204 and executing the program using the CPU 203. The flowchart of FIG. 6C corresponds to S613.

In S631, the CPU 203 controls the LED 111 through a scanner control circuit, which is not illustrated, in such a way as to sequentially emit light in the wavelength bands of R, G, and B. Periods for light of the three colors are denoted by To_R, To_G, and To_B, respectively, which are obtained in the light controlling. The light of the three colors is reflected by the white reference sheet 114 and sequentially enters the sensor array 113. Thereafter, analog outputs (electrical signals) corresponding to the light of the three colors are obtained from the sensors included in the sensor array 113, and the obtained electrical signals are converted into digital data through the A/D conversion circuit. The CPU 203 thus obtains output values (Osh_on) with the LED 111 turned on.

In S632, the CPU 203 obtains the output values (Osh_on) from the sensors included in the sensor array 113 and temporarily saves the output values to a shading correction data storage area of the RAM 204. Osh_on denotes a group of a plurality of output values obtained from a plurality of sensors. In the present embodiment, data to be saved is only data corresponding to the outputs of one line in the main scanning direction, and values of the data are Osh_on_R, Osh_on_G, and Osh_on_B for the three colors of light, respectively. The data corresponding to the outputs of one line in the main scanning direction may be data corresponding to the outputs of one line in the main scanning direction or may be an average of pieces of data corresponding to outputs of a plurality of lines. The CPU 203 may obtain data corresponding to outputs of a plurality of lines by moving (scanning) the CIS 120 under the white reference sheet 114 in the sub-scanning direction and causing the sensors to obtain outputs of different lines. If the CPU 203 has obtained outputs while moving the CIS 120 in the sub-scanning direction, the CPU 203 may sort out the outputs of the sensors in the main scanning direction, exclude some largest and smallest outputs, and average remaining outputs. In this case, effects of dust and singular points on the white reference sheet 114 can be suppressed.

In S633, the CPU 203 obtains maximum values (Osh_max) and minimum values (Osh_min) of the output values (Osh_on) and saves the maximum values and the minimum values to the shading correction data storage area. More specifically, the CPU 203 obtains Osh_Rmax and Osh_Rmin, Osh_Gmax and Osh_Gmin, and Osh_Bmax and Osh_Bmin, which are the maximum values and the minimum values, respectively, from Osh_on_R, Osh_on_G, and Osh_on_B. At this time, the CPU 203 does not obtain the maximum and minimum values from all values of Osh_on_R, Osh_on_G, and Osh_on_B. More specifically, the CPU 203 obtains the maximum and minimum values from Osh_on_R, Osh_on_G, and Osh_on_B on the basis of outputs of the sensors that face the contact glass 115. If the sensor array 113 is longer than the contact glass 115, outputs of the sensors arranged in the portions of the sensor array 113 that do not face the contact glass 115 are always small. If the CPU 203 obtains the minimum values from all the values of Osh_on_R, Osh_on_G, and Osh_on_B, the minimum values will always be outputs of the sensors arranged in the portions of the sensor array 113 that do not face the contact glass 115. In order to avoid this result, the CPU 203 obtains the maximum and minimum values on the basis of data regarding a range in which outputs vary at least if a document is set or if the platen cover 102 is opened and closed. The values obtained here are used for the process for detecting a document, which will be described.

In S634, the CPU 203 turns off the LED 111.

In S635, the CPU 203 obtains output values (Osh_off) from the sensors included in the sensor array 113 with the LED 111 turned off, and temporarily saves the output values to the shading correction data storage area. A method for obtaining the data to be saved at this time is the same as the method for obtaining data in S632. The CPU 203 thus obtains the outputs with the LED 111 turned off.

In S636, the CPU 203 creates the shading correction data from the output values (Osh_on and Osh_off) obtained in S632 and S635. More specifically, the CPU 203 creates the shading correction data for correcting errors in the output values of the sensors on the basis of differences between the output values (Osh_on and Osh_off) obtained in S632 and S635 and predetermined reference output values. The created shading correction data is saved to the shading correction data storage area. After the shading correction data is created, the temporarily saved output values Osh_on and Osh_off are deleted from the shading correction data storage area.

A shading correction section 321 included in the image processing unit 216 includes a circuit that calculates data subjected to correction (shading correction) based on the shading correction data from image data obtained as a result of scanning. After the image data obtained as a result of the scanning and the shading correction data are input to the shading correction section 321 during the scanning, digital image data subjected to the shading correction is created. In the present embodiment, one of various known methods may be used for the shading correction, and details thereof are not particularly limited.

Although an image obtained as a result of scanning is a color image obtained by emitting light of R, G, and B in the present embodiment, the present embodiment can also be applied, for example, to a mode in which only an image obtained by emitting light of G is used and a mode in which light of the three colors is emitted but the sensors output values corresponding only to one of the three colors. If a CCD image sensor is used to read an image, the scanner 214 includes three sensors that produce outputs corresponding to R, G, and B. In this case, the values Osh_Rmax and Osh_Rmin, Osh_Gmax and Osh_Gmin, and Osh_Bmax and Osh_Bmin are obtained as maximum and minimum values of data corresponding to the output of one line of the sensors in the main scanning direction. After the shading correction ends, the CPU 203, in S614, moves the CIS 120 to the standby position 1106.

The process for obtaining shading correction data according to the present embodiment has been described. The results of the light controlling for the three colors of light obtained in this process and the maximum and minimum values obtained during the shading correction are used for the process for detecting an unremoved document, which will be described later. The process for obtaining shading correction data may be performed before each scanning operation, after the MFP 100 is turned on, or if a significant error has occurred in the outputs of the sensors. Whether a significant error has occurred in the outputs of the sensors can be determined by regularly obtaining the outputs of the sensors under the same conditions and detecting a timing at which a significant error has occurred in the obtained outputs.

Process for Detecting Unremoved Document

The process for detecting an unremoved document performed by the MFP 100 in the present embodiment will be described. As described above, in the present embodiment, the process for detecting an unremoved document includes the process for detecting a document and the process for detecting opening and closing.

FIG. 7A is a flowchart illustrating the process for detecting an unremoved document performed by the MFP 100. In the present embodiment, a mode in which presence or absence of a document is detected during scanning will be described. The process illustrated in the flowchart of FIG. 7A is achieved, for example, by reading a program stored in the ROM 205 or the like to the RAM 204 and executing the program using the CPU 203. This process begins if the MFP 100 has received a scanning job or the like and performs scanning.

In S7001, the CPU 203 initializes Line_cnt and Doc_on_flg. More specifically, the CPU 203 sets Line_cnt to 0 and Doc_on_flg to off. Line_cnt is a variable indicating the number of lines in the sub-scanning direction identified in the process for detecting a document, which will be described later, as a line on which there is a document. Doc_on_flg is a variable (flag) indicating a final result of a determination whether there is a document on the platen 101. If Doc_on_flg is on, there is a document on the platen 101, and if Doc_on_flg is off, there is no document on the platen 101. After the initialization, the CPU 203 moves the CIS 120 to a reading start position and starts scanning. That is, the CPU 203 causes the CIS 120 to start scanning within a range specified by the job management application 412.

In S7002, the CPU 203 determines whether to end the scanning. More specifically, the CPU 203 determines whether the CIS 120 has moved in the sub-scanning direction to complete the scanning in the range specified by the job management application 412. Even more specifically, the CPU 203 determines whether the CIS 120 has moved to a scanning end position. If determining that the scanning is not to end, the CPU 203 proceeds to S7003, and if determining that the scanning is to end, the CPU 203 proceeds to S7011.

In S7003, the CPU 203 turns on the LED 111 and obtains, from the sensors, the outputs of one line in the main scanning direction at a current position of the CIS 120. The CPU 203 then saves, among the obtained outputs, outputs (Ord_on) corresponding to a scanning range specified by the job management application 412 to a scanning image data storage area (not illustrated).

In S7004, the CPU 203 performs the process for detecting a document on the basis of the outputs obtained in S7003. Details of the process for detecting a document will be described later.

In S7005, the CPU 203 determines whether there is a document at the current position of the CIS 120 on the basis of a result of the process for detecting a document in S7004. If it is determined in the process for detecting a document that there is a document, the CPU 203 proceeds to S7006. If it is determined in the process for detecting a document that there is no document, the CPU 203 proceeds to S7009.

In S7006, the CPU 203 increments Line_cnt.

In S7007, the CPU 203 determines whether Line_cnt is larger than a certain threshold (Line_cnt_on). If there is a document on the contact glass 115, lines on which it is determined that there is a document continue for more than the certain value (Line_cnt_on). That is, there are more than a certain number of lines on which it is determined that there is a document. If determining that Line_cnt is larger than the certain threshold (Line_cnt_on), the CPU 203 proceeds to S7008 and sets Doc_on_flg to on. That is, the CPU 203 determines, as a result of the final determination, that there is a document on the contact glass 115. The CPU 203 then proceeds to S7010. If the determining that Line_cnt is equal to or smaller than a certain threshold (Line_cnt_on), on the other hand, the CPU 203 proceeds to S7010 without updating Doc_on_flg.

As described above, in the present embodiment, the final determination as to presence or absence of a document on the contact glass 115 is not made only on the basis of a result of a determination based on data regarding one line in the main scanning direction but made if there are a plurality of lines on which it has been determined that there is a document. That is, in the present embodiment, if there are more than a certain number of lines on which Abs(1−Ord_min/Osh_min) is larger than a certain threshold (DocDct_MAX_TH), it is determined, as a result of the final determination, that there is a document on the contact glass 115. This is because if there is dust or the like on the white sheet 105 or the contact glass 115, for example, the CPU 203 might erroneously determine that there is a document on a line on which there is the dust or the like. An arbitrary value may be set to Line_cnt_on in consideration of the above case. By appropriately setting Line_cnt_on, an erroneous final determination as to presence or absence of a document can be suppressed. In the present embodiment, the certain threshold (Line_cnt_on) is a value corresponding to a width of 2 mm, and if lines on which it has been determined that there is a document continue for more than the width of 2 mm, it is determined, as a final determination, that there is a document on the contact glass 115.

In S7009, the CPU 203 initializes Line_cnt. More specifically, the CPU 203 sets Line_cnt to 0.

In S7010, the CPU 203 moves the CIS 120 to a next reading position and performs S7002 again. That is, the CPU 203 repeats the reading of a document and the process for detecting a document until the scanning ends. If the CPU 203 has updated Doc_on_flg to on in S7008, the CPU 203 need not perform S7004 to S7009 in the subsequent repetition. That is, if determining that there is a document on the contact glass 115, the CPU 203 need not perform the process for detecting a document in the subsequent repetition and may perform only the determination whether to end the scanning (S7002) and the reading of a document (S7003).

By configuring the process for detecting an unremoved document as illustrated in FIG. 7A, the MFP 100 can perform the scanning of a document and the process for detecting a document in parallel with each other.

Figure 3:
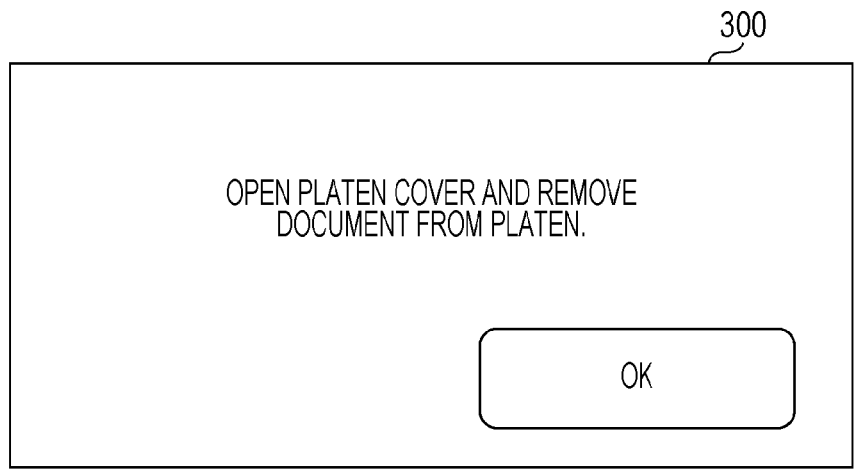
FIG. 3 illustrates an example of a screen for notifying a user of an unremoved document.

After ending the scanning based on the received scanning job, the CPU 203 checks a state of Doc_on_flg in S7011. As described above, if it is determined that there is a document on the contact glass 115, Doc_on_flg is updated in S7008. If there is a document on the contact glass 115, the user desirably removes the document from the platen 101 immediately after the end of the scanning. Since the platen cover 102 needs to be opened and closed in order to remove a document from the platen 101, whether the document has been removed from the platen 101 can be determined by detecting whether the platen cover 102 has been opened and closed. If Doc_on_flg is on, therefore, the CPU 203 proceeds to S7012 and performs the process for detecting opening and closing. The process for detecting opening and closing is a process for determining whether the platen cover 102 has been opened and closed. With this process, the CPU 203 can determine whether the user has removed a scanned document. If determining that the platen cover 102 has not been opened or closed for a certain period of time since the end of the scanning, the CPU 203 determines that the user forgot to remove the scanned document, and notifies the user of the unremoved document (details of this process will be described later). More specifically, for example, the CPU 203 displays, on the UI 215, a screen (e.g., a screen illustrated in FIG. 3) for notifying the user of the unremoved document or issues an alarm sound for notifying the user of the unremoved document. Alternatively, for example, the CPU 203 transmits, to an external apparatus that has transmitted the scanning job, information for displaying a screen for notifying the user of the unremoved document. Details of the process for detecting opening and closing will be described later.

If there is no document on the contact glass 115, on the other hand, Line_cnt does not exceed the certain threshold (Line_cnt_on), and Doc_on_flg remains off. If Doc_on_flg is off, therefore, the CPU 203 proceeds to S7013. The CPU 203 moves the CIS 120 to the standby position 1106 and ends the process without performing the process for detecting opening and closing. That is, the CPU 203 ends the process without performing the process for notifying the user of the unremoved document.

As described above, in the present embodiment, if there is a document on the contact glass 115, the process for detecting opening and closing is performed, and if there is no document on the contact glass 115, the process for detecting opening and closing is not performed. In the present embodiment, therefore, if there is no document on the contact glass 115 and the process for detecting opening and closing need not be performed, a processing load caused by the process for detecting opening and closing can be reduced, and an operation to be performed next can start rapidly. In addition, it is possible to avoid notifying the user of an unremoved document if there is no document on the contact glass 115.

If the CPU 203 has performed scanning on the basis of a scanning job transmitted from an external apparatus, the CPU 203 usually transmits read image data to the external apparatus after the scanning. At this time, it might take time to complete the transmission of the image data to the external apparatus depending on the size of the read image data and speed at which the CPU 203 communicates with the external apparatus. This holds true for image data read without a document set on the contact glass 115. If a scanning job is transmitted without a document set on the contact glass 115, therefore, data communication might be performed for a long time even through the user will not obtain desired image data. In the present embodiment, if it is determined as a result of the process for detecting a document that there is no document, the CPU 203 does not transmit image data obtained as a result of the scanning to the external apparatus. In doing so, image data obtained without a document set on the contact glass 115 is not transmitted to the external apparatus.

If the result of the process for detecting a document indicates that there is no document, the CPU 203 may notify, through the external apparatus, the user that image data has been obtained without a document set on the contact glass 115. If the CPU 203 notifies the user that image data has been obtained without a document set on the contact glass 115, the CPU 203 transmits, to the external apparatus, information for displaying a screen for the notification. As a result, the screen for the notification is displayed on a display unit of the external apparatus. Using this screen, the user can input an instruction to cancel the transmission of the image data obtained without a document set on the contact glass 115 or an instruction to transmit the image data. That is, the user can determine which instruction is to be input by checking the notification.

Although reading of one line in the main scanning direction by the CIS 120 and movement of the CIS 120 for one line in the main scanning direction alternate in the present embodiment, the operation performed is not limited to this. For example, time taken for the CIS 120 to read one line in the main scanning direction may be set sufficiently short relative to the moving speed of the CIS 120, and outputs of one line of the CIS 120 in the main scanning direction may be obtained while moving the CIS 120 at constant speed.

Process for Detecting Document

Figure 7B:
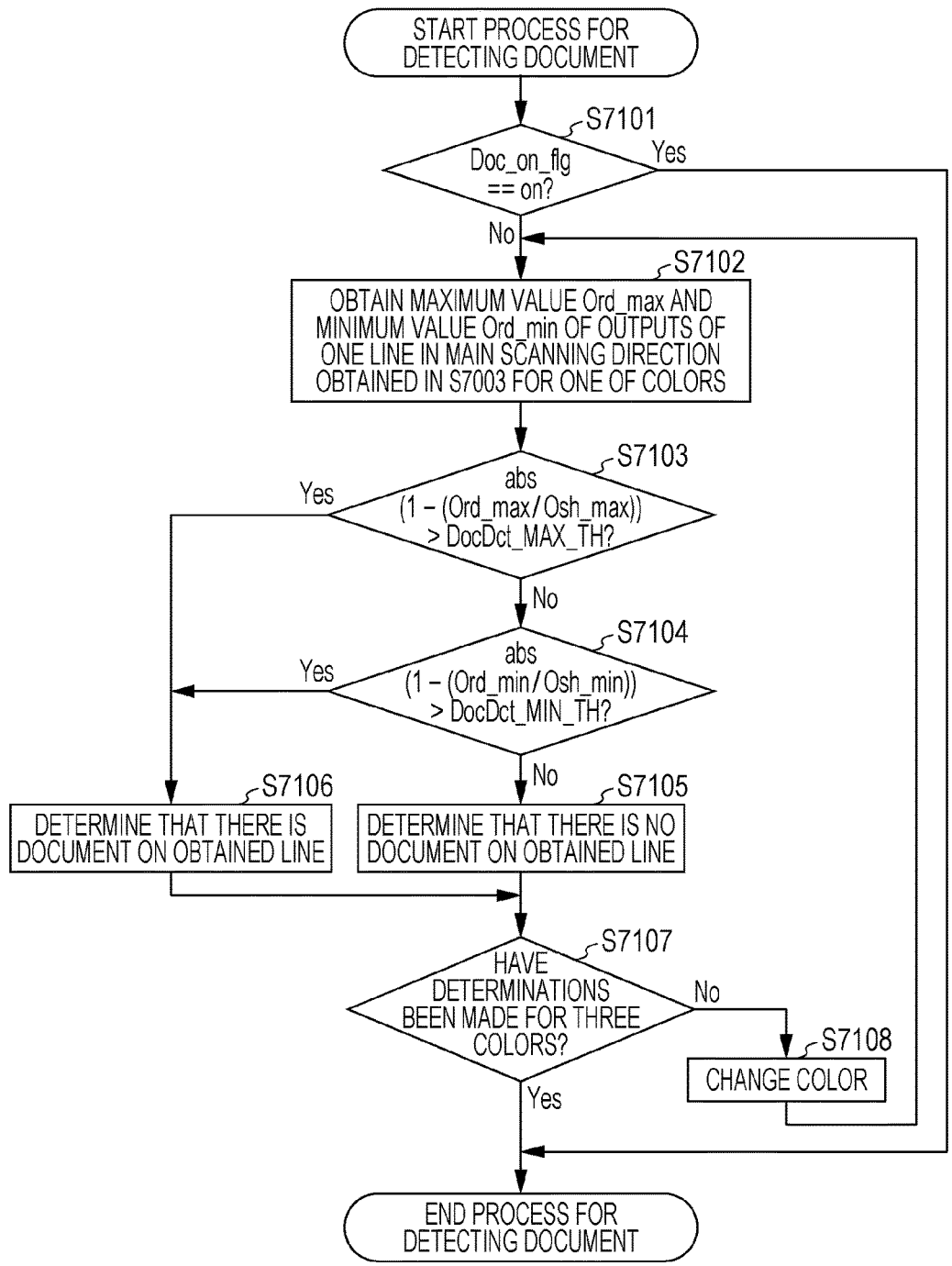

Next, details of the process for detecting a document in S7004 will be described with reference to FIG. 7B. With the process for detecting a document according to the present embodiment, whether a document is set on the platen 101 can be detected while scanning is being performed in a scanning range based on a scanning job. That is, the process for detecting a document is a process for determining whether a document is set on the platen 101. FIG. 7B is a flowchart illustrating the process for detecting a document performed by the MFP 100. The process illustrated in the flowchart of FIG. 7B is achieved, for example, by reading a program stored in the ROM 205 or the like to the RAM 204 and executing the program using the CPU 203.

In the process for detecting a document in S7004, presence or absence of a document is determined in units of lines. A line subjected to the determination is a line read by the sensors in S7003, that is, a line corresponding to the current position of the CIS 120.

First, in S7101, the CPU 203 determines whether Doc_on_flg is on. That is, the CPU 203 determines whether it has been determined, as a final determination, that there is a document on the contact glass 115. If determining that Doc_on_flg is on, the CPU 203 ends the process for detecting a document since the process for detecting a document need not be performed for each line. If determining that Doc_on_flg is not on (that is, off), the CPU 203 proceeds to S7102.

In S7102, the CPU 203 obtains a maximum value and a minimum value (Ord_max and Ord_min) of the outputs (Ord_on) of one line in the main scanning direction obtained in S7003. In the present embodiment, the CPU 203 can obtain Ord_Rmax and Ord_Rmin, Ord_Gmax and Ord_Gmin, or Ord_Bmax and Ord_Bmin as Ord_max and Ord_min for the corresponding color. Here, the CPU 203 obtains the maximum value and the minimum value for a color for which the maximum value and the minimum value have not been obtained.

At this time, a range of data from which Ord_max and Ord_min are obtained is the same as the range of data in which the values such as Osh_Rmax and Osh_Rmin have been obtained in S633 illustrated in FIG. 6C. That is, if the CPU 203 has obtained Osh_Rmax from the outputs of the sensors that face the contact glass 115, for example, the CPU 203 obtains Ord_max from the outputs of the sensors that face the contact glass 115.

In S7103, the CPU 203 calculates a difference, as a ratio, between the maximum value Ord_max and the maximum value (Osh_max) obtained during the above-described process for obtaining shading correction data. Here, the following expression is used.

$$\text{Abs}(1 - Ord\_\text{max}/Osh\_\text{max})$$

If Ord_max and Osh_max are substantially the same, a result of the above expression becomes close to 0. If the difference between Ord_max and Osh_max is large, on the other hand, the result of the above expression becomes close to 1. In the present embodiment, if the result of the above expression is larger than the certain threshold (that is, if the difference between Ord_max and Osh_max is large), the CPU 203 proceeds to S7106 and determines that there is a document on the line subjected to the determination. If the result of the above expression is equal to or smaller than the certain threshold (that is, if the difference between Ord_max and Osh_max is small), the CPU 203 proceeds to S7104.

In S7104, the CPU 203 calculates a difference, as a ratio, between the minimum value Ord_min and the minimum value (Osh_min) obtained during the above-described process for obtaining shading correction data. Here, the following expression is used.

$$\text{Abs}(1 - Ord\_\text{min}/Osh\_\text{min})$$

As in S7103, if a result of the above expression is larger than a certain threshold (that is, if the difference between Ord_min and Osh_min is large), the CPU 203 determines that there is a document on the line subjected to the determination. In the present embodiment, if the result of the above expression is larger than the certain threshold (that is, if the difference between Ord_min and Osh_min is large), the CPU 203 proceeds to S7106 and determines that there is a document on the line subjected to the determination. If the result of the above expression is equal to or smaller than the certain threshold (that is, if the difference between Ord_min and Osh_min is small), on the other hand, the CPU 203 proceeds to S7105 and determines that there is no document on the line subjected to the determination.

In S7107, the CPU 203 determines whether the determinations in S7103 and/or S7104 have been made for the three colors of R, G, and B. If there is a color for which the determinations in S7103 and/or S7104 have not been made, the CPU 203, in S7108, changes the color subjected to the determination and performs S7102 to S7104 for a new color subjected to the determination.

As described above, in the present embodiment, the CPU 203 performs calculations using the above expressions in order to obtain Ord_max and Ord_min for each color. If at least one of the results of the above expressions for each color is larger than the corresponding threshold, the CPU 203 determines that there is a document on the line subjected to the determination. If no result is larger than the certain threshold (DocDct_MAX_TH), on the other hand, the CPU 203 determines that there is no document on the line subjected to the determination.

The determinations based on the first and second expressions are essentially equivalent to determinations whether the differences are larger than the corresponding thresholds. The first and second expressions, therefore, need not be used, and whether there is a document on the line subjected to the determination may be determined, for example, by comparing the differences with the corresponding thresholds. More specifically, in this case, if at least one of the differences is larger than the corresponding threshold, the CPU 203 determines that there is a document, and if the differences are equal to or smaller than the corresponding thresholds, the CPU 203 determines that there is no document.

In the present embodiment, the comparison between the maximum value Ord_max and the maximum value Osh_max and the comparison between the minimum value Ord_min and the minimum value Osh_min are performed in order to improve detection accuracy. If there is dust on a line, for example, the difference between the minimum value Ord_min and the minimum value Osh_min might become small even if there is no document on the line. If there is a document with a hole on a line, for example, the difference between the maximum value Ord_max and the maximum value Osh_max might become small. In consideration of these cases, the comparison between the maximum values and the comparison between the minimum values are performed.

Alternatively, in order to reduce a load relating to the determination, only a single comparison between values may be performed. Alternatively, in order to improve the accuracy, three or more comparisons between values may be performed. Values used for the comparison(s) are not limited to maximum and minimum values. Any values suitable for the comparison(s), such as intermediate values or values in a certain relationship with the maximum or minimum values, may be used.

A method for determining a threshold DocDct_MIN_TH and the threshold DocDct_MAX_TH will be described later.

Figure 8:
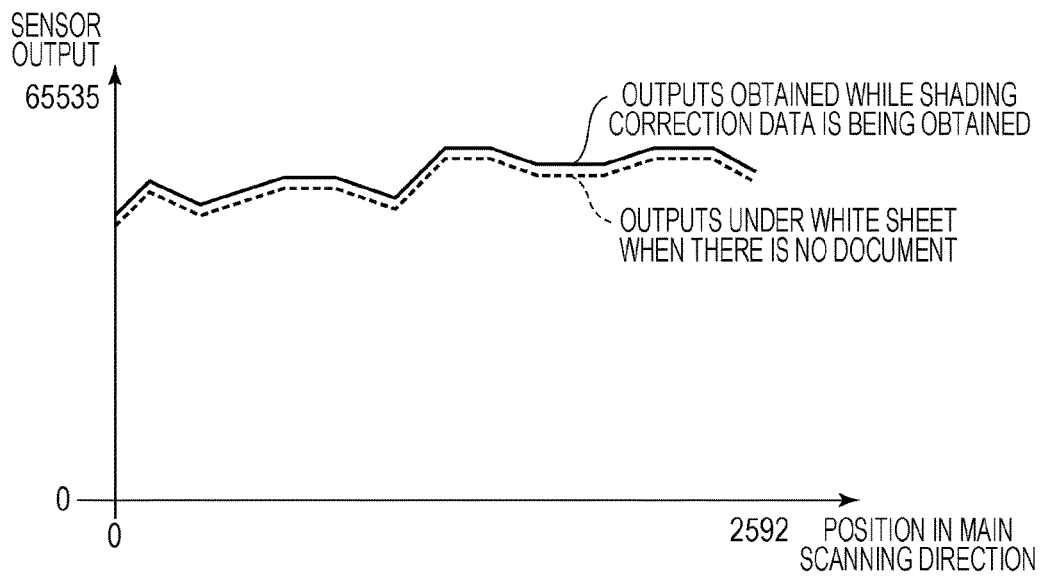
FIG. 8 is a graph indicating outputs obtained during scanning and outputs obtained during a process for obtaining shading correction data.

Next, a reason why the process for detecting a document using the maximum and minimum values of the outputs obtained during scanning and the maximum and minimum values of the outputs obtained during the process for obtaining shading correction data can be performed will be described. FIG. 8 is a diagram illustrating outputs corresponding to light of R obtained during the process for obtaining shading correction data and outputs of one line in the main scanning direction corresponding to the light of R obtained during scanning without a document set on the contact glass 115. FIG. 8 indicates the outputs represented by the shading correction data with a solid line and the outputs obtained during the scanning without a document set on the contact glass 115 with a broken line. In the graph of FIG. 8, the horizontal axis represents a position in the main scanning direction, and the vertical axis represents an output value (digital data) at the position. In the present embodiment, it is assumed that the white reference sheet 114 and the white sheet 105 have the same color and output values obtained from light reflected from the white reference sheet 114 and the white sheet 105 are close to each other. In this case, as illustrated in FIG. 8, the outputs obtained during the process for obtaining shading correction data and the outputs obtained during the scanning without a document set on the contact glass 115 are close to each other. The difference between Ord_Rmin and Ord_Rmin becomes extremely small, and the results of the calculations in S7103 and S7104 both become extremely small values (close to 0). For this reason, if determining that the results of the calculations are equal to or smaller than the corresponding thresholds in S7103 and S7104, the CPU 203 determines that there is no document on the line subjected to the determination.

Figure 9:
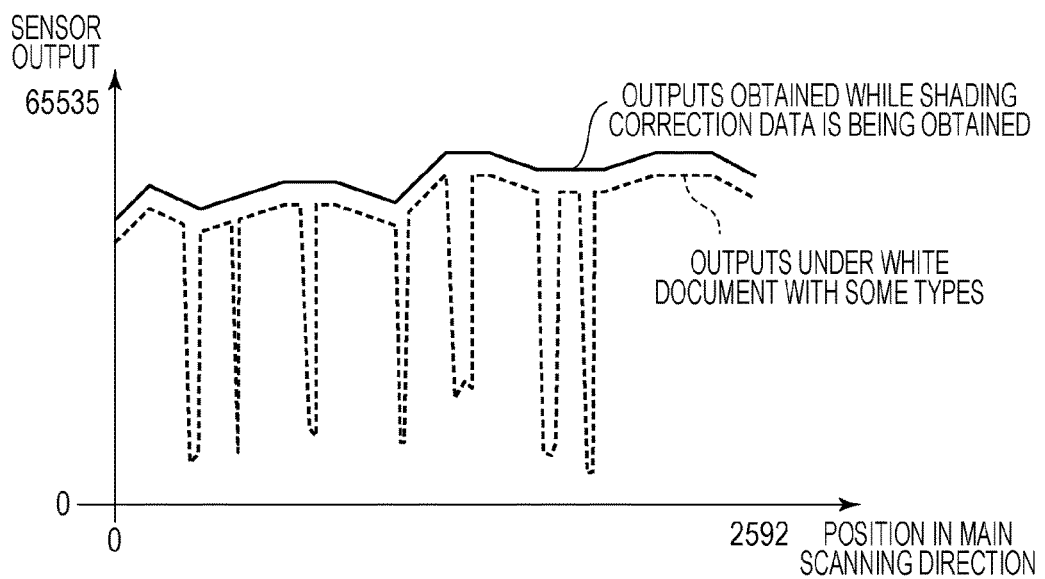
FIG. 9 is a graph indicating outputs during the scanning and outputs obtained during the process for obtaining shading correction data.

FIG. 9, on the other hand, is a diagram illustrating the outputs corresponding to light of R obtained during the process for obtaining shading correction data and outputs of one line in the main scanning direction corresponding to the light of R obtained during the scanning with a document set on the contact glass 115. Details of the graph of FIG. 9 are the same as those of the graph of FIG. 8, and description thereof is omitted. The document on the contact glass 115 while the data is being obtained in FIG. 9 is a white recording medium with black types. If light is radiated onto the black types during the scanning, most of the light is absorbed by the black types and not reflected. On lines corresponding to the black types, therefore, light input to the sensors becomes small, and accordingly the output values obtained from the sensors become small. In FIG. 9, portions in which the output values sharply decrease correspond to the black types. In the black types, the outputs obtained during the process for obtaining shading correction data and the outputs obtained during the scanning with the document on the contact glass 115 significantly differ from each other. Ord_Rmin, therefore, becomes significantly smaller than Osh_Rmin, and the result of the calculation in S7104 becomes large (close to 1). For this reason, if determining in S7104 that the result of the calculation is larger than the certain threshold, the CPU 203 determines that there is a document on the line subjected to the determination.

Figure 10:
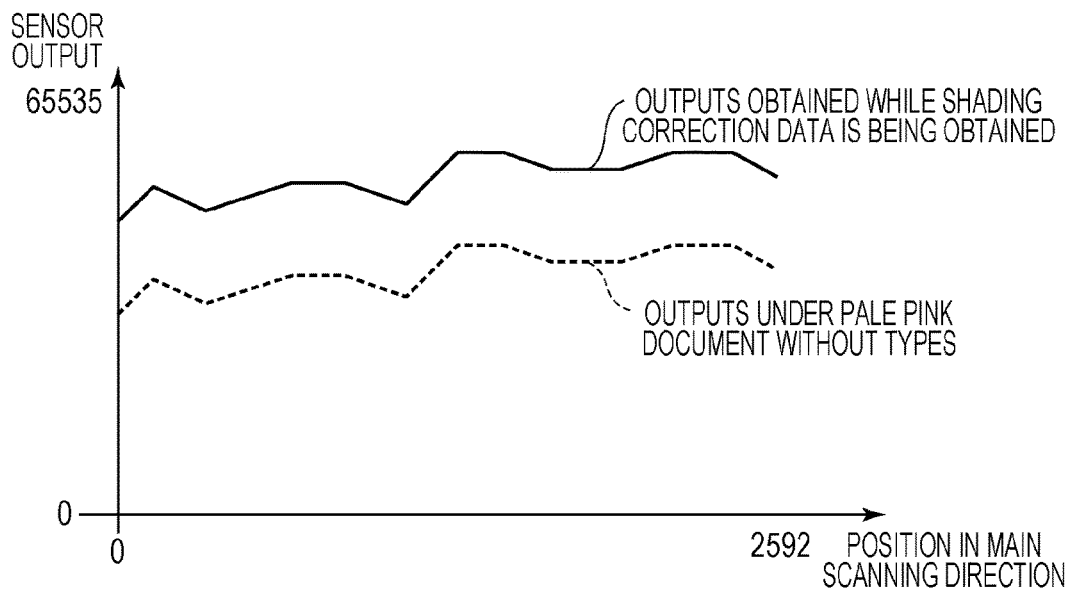
FIG. 10 is a graph indicating the outputs obtained during the scanning and outputs obtained during the process for obtaining shading correction data.

FIG. 10 is a diagram illustrating outputs corresponding to light of G obtained during the process for obtaining shading correction data and outputs of one line in the main scanning direction corresponding to the light of G obtained during scanning with a document set on the contact glass 115. Details of the graph of FIG. 10 are the same as those of the graph of FIG. 8, and description thereof is omitted. The document on the contact glass 115 in FIG. 10 is a pale pink recording medium on which no types or images are printed. Because a pink recording medium absorbs more light than the white reference sheet 114, the outputs obtained during the scanning with the document set on the contact glass 115 are smaller than the outputs obtained during the process for obtaining shading correction data. Ord_Gmin, therefore, becomes significantly smaller than Osh_Gmin, and the result of the calculation in S7104 becomes large. Among outputs obtained by scanning the pale pink recording medium, outputs corresponding to light of R are not significantly different from the outputs obtained during the process for obtaining shading correction data. For this reason, a comparison between the outputs obtained during the process for obtaining shading correction data and outputs obtained during the scanning can be performed not only for one of the three colors of light but for all the three colors. In doing so, not only a pale pink recording medium but also a pale green recording medium or a pale blue recording medium, for example, can be detected.

In the present embodiment, whether there is a white recording medium on which no types or images are printed on the contact glass 115 can be detected depending on conditions. If a document set on the contact glass 115 is thick, a gap is caused between the contact glass 115 and the white sheet 105. In an area in which there is the gap, outputs obtained by the sensors become small. This is because a distance between the white sheet 105 and the sensor array 113 becomes large due to the gap and light reflected from the white sheet 105 attenuates before reaching the sensor array 113. The white recording medium on which no types or images are printed, therefore, can be detected by performing scanning in a range wider than the document and comparing outputs obtained during the process for obtaining shading correction data and outputs obtained during scanning in a portion in which the light attenuates due to the gap. A gap is likely to be caused in an area of tens of millimeters in length from an edge of a document set on the contact glass 115. In the present embodiment, if lines on which it has been determined that Line_cnt is larger than the certain threshold (Line_cnt_on) continue for a width of 2 mm or more, it is determined, as a final determination, that there is a document on the contact glass 115. Appropriate determinations can therefore be made in the above cases.

The method for determining the thresholds DocDct_MIN_TH and DocDct_MAX_TH will be described. The thresholds DocDct_MIN_TH and DocDct_MAX_TH are determined in accordance with a difference between the whiteness of the white reference sheet 114 and that of the white sheet 105. As illustrated in FIGS. 8 to 10, if the whiteness of the white reference sheet 114 and that of the white sheet 105 are substantially the same, the result of the calculation of the first expression and the result of the calculation of the second expression are substantially 0 unless there is a document on the contact glass 115. The thresholds DocDct_MIN_TH and DocDct_MAX_TH, therefore, may be set to small values, namely, for example, about 0.2. In this case, Ord_min or Ord_max becomes a value smaller than 80% of Osh_min or Osh_max, a document on the contact glass 115 can be detected. In the example illustrated in FIG. 8, Osh_max is about 58,000, and Osh_min is about 4,000. A document on the contact glass 115 can be detected, therefore, if Ord_max becomes about 52,000 or Osh_min becomes about 36,000.

In the present embodiment, the whiteness of the white reference sheet 114 and that of the white sheet 105 are substantially the same. If the white sheet 105 is greyer than the white reference sheet 114, the result of the calculation of the first expression and the result of the calculation of the second expression undesirably become large even if there is no document on the contact glass 115. In this case, the thresholds DocDct_MIN_TH and DocDct_MAX_TH are set larger than if the whiteness of the white reference sheet 114 and that of the white sheet 105 are substantially the same. In doing so, a possibility of an erroneous determination can be suppressed.

Although the thresholds DocDct_MAX_TH and DocDct_MIN_TH are constant regardless of the color of light in the present embodiment, the thresholds used may be changed for each color depending on a color difference between the white reference sheet 114 and the white sheet 105. It is assumed, for example, that the white sheet 105 is redder than the white reference sheet 114. In this case, outputs corresponding to light of R with the white sheet 105 become smaller than if the color difference between the white reference sheet 114 and the white sheet 105 is smaller. If the white sheet 105 is redder than the white reference sheet 114, therefore, the thresholds for light of R are set larger than if the color difference between the white reference sheet 114 and the white sheet 105 is smaller. In doing so, an effect of a difference in the output values caused by the color difference between the white reference sheet 114 and the white sheet 105 can be reduced.

As described above, in the present embodiment, presence or absence of a document is detected by comparing outputs obtained during the process for obtaining shading correction data and outputs obtained during scanning. As a result, for example, the amount of data saved in the RAM 204 and time taken to complete the detection can be reduced compared to if a method for detecting presence or absence of a document by comparing two pieces of image data obtained by performing scanning again after the first scanning operation ends is used.

Process for Detecting Opening and Closing

Next, details of the process for detecting opening and closing in S7012 will be described with reference to FIGS. 7C and 7D. A method in which a dedicated sensor is used to detect opening and closing is known as a method for detecting opening and closing of the platen cover 102. In the present embodiment, however, a method will be proposed in which opening and closing of the platen cover 102 can be detected without a dedicated sensor.

Figure 7D:
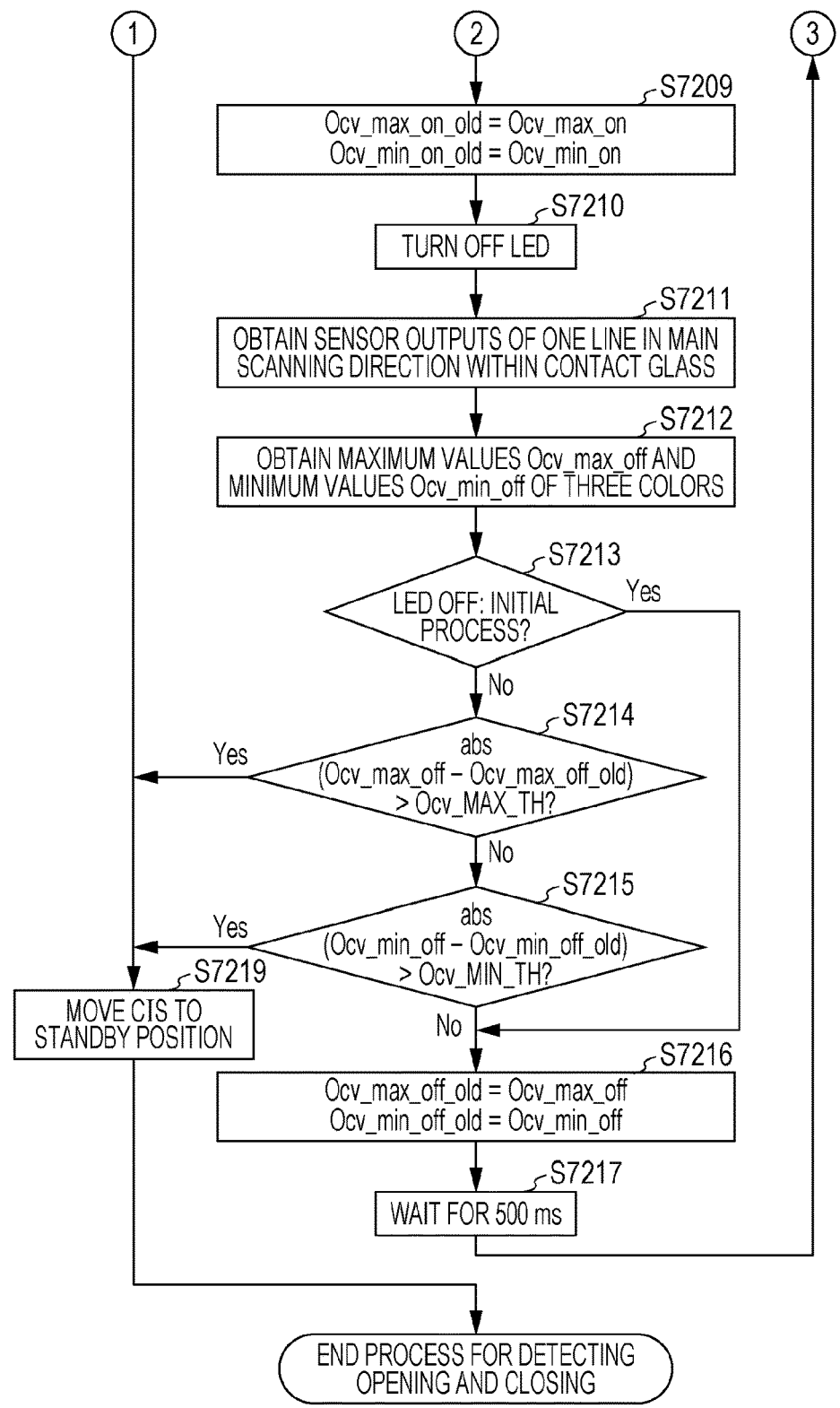

FIGS. 7C and 7D are flowcharts illustrating the process for detecting opening and closing performed by the MFP 100. The process for detecting opening and closing is a process for determining whether the platen cover 102 that was closed has been moved. Through the process for detecting opening and closing according to the present embodiment, whether a document is set on the platen 101 can be detected at a certain timing after scanning is performed in a scanning range based on a scanning job. Whether there is an unremoved document can therefore be detected as a result of the process for detecting opening and closing at the certain timing after the scanning is performed in the scanning range based on the scanning job. The process illustrated in the flowchart of FIGS. 7C and 7D can be achieved, for example, by reading a program stored in the ROM 205 or the like to the RAM 204 and executing the program using the CPU 203.

In S7201, the CPU 203 moves the CIS 120 to an opening and closing detection position. The opening and closing detection position is a position a certain distance away from an edge of a scanning range specified by the job management application 412 in a direction opposite to the standby position in the sub-scanning direction. FIG. 11 is a schematic diagram illustrating the scanner 214 viewed from above. In FIG. 11, a state in which the CIS 120 has moved to the opening and closing detection position in S7201 is illustrated. A range 1102 is a scanning range specified by the job management application 412, and a position 1101 is the opening and closing detection position in the present embodiment. The CPU 203 may seamlessly move the CIS 120 to the opening and closing detection position without stopping the driving of the CIS 120 after scanning. A position 1106 is a standby position, a position 1107 is a position at which the scanning starts, and a position 1103 is a position at which the scanning ends.

In S7202, the CPU 203 determines whether a certain period of time has elapsed since the process for detecting opening and closing started. If determining that the certain period of time has elapsed since the process for detecting opening and closing started, the CPU 203 proceeds to S7218, and if determining that the certain period of time has not elapsed since the process for detecting opening and closing started, the CPU 203 proceeds to S7203.

Alternatively, in S7202, the CPU 203 may determine whether a certain period of time has elapsed since the scanning started.

In S7203, the CPU 203 turns on the LED 111. Periods for which light of the three colors is emitted are To_R, To_G, and To_B, respectively, determined in the light controlling in S612 of the process for obtaining shading correction data.

In S7204, the CPU 203 obtains outputs (Ocv_on) of one line of the sensors in the main scanning direction that face the contact glass 115 at the opening and closing detection position.

In S7205, the CPU 203 obtains maximum values and minimum values of the outputs obtained in S7204 for the three colors of light. The values for the three colors of light obtained here are denoted by Ocv_max_on_R, Ocv_min_on_R, Ocv_max_on_G, Ocv_min_on_G, Ocv_max_on_B, and Ocv_min_on_B.

In S7206, the CPU 203 determines whether S7205 has been performed for the first time. If S7205 has been performed for the first time, the CPU 203 proceeds to S7209, and if S7205 has not been performed for the first time, the CPU 203 proceeds to S7207.

In S7209, the CPU 203 changes a way in which the values obtained in S7205 are treated. More specifically, the CPU 203 saves Ocv_max_on_R and Ocv_min_on_R, which are outputs corresponding to the light of R, while changing Ocv_max_on_R and Ocv_min_on_R to Ocv_max_on_R old and Ocv_min_on_R old, respectively. Similarly, the CPU 203 saves Ocv_max_on_G and Ocv_min_on_G, which are outputs corresponding to the light of G, while changing Ocv_max_on_G and Ocv_min_on_G to Ocv_max_on_G old and Ocv_min_on_G old, respectively. Furthermore, the CPU 203 saves Ocv_max_on_B and Ocv_min_on_B, which are outputs corresponding to the light of B, while changing Ocv_max_on_B and Ocv_min_on_B to Ocv_max_on_B old and Ocv_min_on_B old, respectively. Here, the CPU 203 changes only the way in which the values obtained in S7205 are treated, and does not change the values themselves.

In S7210, the CPU 203 turns off the LED 111.

In S7211, the CPU 203 obtains outputs (Ocv_off) of one line of the sensors in the main scanning direction that face the contact glass 115. S7211 is the same as S7204 except that the LED 111 has been turned off.

S7212, the CPU 203 obtains maximum values and minimum values of the outputs obtained in S7211 for the three colors of light. The values for the three colors of light obtained here are denoted by Ocv_max_off_R, Ocv_min_off_R, Ocv_max_off_G, Ocv_min_off_G, Ocv_max_off_B, and Ocv_min_off_B.

In S7213, the CPU 203 determines whether S7212 has been performed for the first time. If S7212 has been performed for the first time, the CPU 203 proceeds to S7214, and if S7212 has not been performed for the first time, the CPU 203 proceeds to S7216.

In S7216, the CPU 203 changes a way in which the values obtained in S7212 are treated. The CPU 203 saves Ocv_max_off_R and Ocv_min_off_R, which are outputs corresponding to the light of R, while changing Ocv_max_off_R and Ocv_min_off_R to Ocv_max_off_R old and Ocv_min_off_R old, respectively. Similarly, the CPU 203 saves Ocv_max_off_G and Ocv_min_off_G, which are outputs corresponding to the light of G, while changing Ocv_max_off_G and Ocv_min_off_G to Ocv_max_off_G old and Ocv_min_off_G old, respectively. Furthermore, the CPU 203 saves Ocv_max_off_B and Ocv_min_off_B, which are outputs corresponding to the light of B, while changing Ocv_max_off_B and Ocv_min_off_B to Ocv_max_off_B old and Ocv_min_off_B old, respectively. Here, as in S7209, the CPU 203 changes only the way in which the values obtained in S7212 are treated, and does not change the values themselves.

In S7217, the CPU 203 waits for a certain period of time. In the present embodiment, the CPU 203 waits for 500 ms, but the certain period of time is not limited to this. If the platen cover 102 is opened and then closed after a document is removed while the CPU 203 is waiting, the opening of the platen cover 102 is not correctly detected. The certain period of time for which the CPU 203 waits, therefore, can be short enough to enable the CPU 203 to detect opening of the platen cover 102.

After 500 ms, the CPU 203 performs S7202 and later steps.

In S7207, the CPU 203 determines whether differences between Ocv_max_on and Ocv_max_on old are larger than a certain threshold Ocv_MAX_TH for the three colors of light. That is, the CPU 203 compares the newly obtained output values with previously obtained output values. If there is no change in the state of the platen cover 102 in 500 ms, there are almost no differences between the newly obtained output values and the previously obtained output values. If the platen cover 102 is opened in 500 ms, on the other hand, the amount of light incident on the sensors changes, and differences are caused between the newly obtained output values and the previously (about 500 ms ago) obtained output values. If determining that the differences between Ocv_max_on and Ocv_max_on old are larger than the certain threshold Ocv_MAX_TH, the CPU 203 determines that the state of the platen cover 102 has changed, and proceeds to S7219. If determining that the differences between Ocv_max_on and Ocv_max_on old are smaller than the certain threshold Ocv_MAX_TH, the CPU 203 determines that the state of the platen cover 102 has not changed, and proceeds to S7208. If the threshold Ocv_MAX_TH is determined on the basis of how much outputs obtained with the platen cover 102 closed and outputs obtained with the platen cover 102 open are different from each other. In the present embodiment, since 16-bit digital values are obtained from the sensors, a maximum value of the outputs of the sensors is 65,535. In the present embodiment, the threshold Ocv_MAX_TH is about 4,000, which is about $\frac{1}{15}$ of the outputs obtained with the platen cover 102 closed in consideration of characteristics of the white sheet 105.

In S7208, the CPU 203 determines whether differences between Ocv_min_on and Ocv_min_on old are larger than a certain threshold Ocv_MIN_TH for the three colors of light. If determining that the differences between Ocv_min_on and Ocv_min_on old are larger than the certain threshold Ocv_MIN_TH, the CPU 203 determines that the state of the platen cover 102 has changed, and proceeds to S7219. If determining that the differences between Ocv_min_on and Ocv_min_on old are smaller than the certain threshold Ocv_MIN_TH, the CPU 203 proceeds to S7209.

In S7214, the CPU 203 determines whether differences between Ocv_max_off and Ocv_max_off old are larger than the certain threshold Ocv_MAX_TH for the three colors of light. In S7215, the CPU 203 determines whether differences between Ocv_min_off and Ocv_min_off old are larger than the certain threshold Ocv_MIN_TH for the three colors of light. S7214 and S7215 are the same as S7207 and S7208, respectively, except that the outputs obtained with the LED 111 turned off are compared with the thresholds.

As in the process for detecting a document, in order to reduce a load relating to the determination, only a single comparison between values, not two comparisons employing a maximum value and a minimum value, may be performed. Alternatively, in order to improve the accuracy, three or more comparisons between values may be performed. Values used for the comparison(s) are not limited to maximum and minimum values. Any values suitable for the comparison(s), such as intermediate values or values in a certain relationship with the maximum or minimum values, may be used.

In the present embodiment, both a process for comparing outputs obtained with the LED 111 turned on and a process for comparing outputs obtained with the LED 111 turned off are performed. This is because if the MFP 100 is installed in a dark room, for example, outputs obtained with the platen cover 102 closed and the LED 111 turned off and outputs obtained with the platen cover 102 open and the LED 111 turned off can become substantially the same. In addition, this is because if the MFP 100 is installed in a bright room, for example, outputs obtained if the platen cover 102 is closed with the LED 111 on and outputs obtained with the platen cover 102 open and the LED 111 turned on can become substantially the same. By performing both the process for comparing outputs obtained with the LED 111 turned on and the process for comparing outputs obtained with the LED 111 turned off, opening and closing of the platen cover 102 can be detected regardless of an environment in which the MFP 100 is installed. Alternatively, in order to reduce a processing load, either the process for comparing outputs obtained with the LED 111 turned on or the process for comparing outputs obtained with the LED 111 turned off may be performed.

As described above, if determining in S7207, S7208, S7214, or S7215 that differences between newly obtained output values and previously obtained output values are larger than a certain threshold, the CPU 203 determines that the state of the platen cover 102 has changed. A change in the state of the platen cover 102 is regarded as equivalent to removal of a document on the contact glass 115 by the user. In S7219, the CPU 203 moves the CIS 120 to the standby position 1106 without notifying the user of an unremoved document.

If determining that the state of the platen cover 102 has not changed even after the certain period of time has elapsed since the process for detecting opening and closing started, the CPU 203 proceeds to S7218 and notifies the user of an unremoved document.

In the present embodiment, the opening and closing detection position is the position the certain distance away from the edge (scanning end position 1103) of the scanning range 1102 specified by the job management application 412 in the direction opposite to the standby position 1106 in the sub-scanning direction. The opening and closing detection position, however, is not limited to this. For example, the opening and closing detection position may be a scanning start position, which is a position at which reading of image data starts, or the scanning end position, which is a position at which reading of image data ends, instead. In this case, if a document is set on the contact glass 115, a state of the document set on the contact glass 115 is read. In this case, too, because obtained output values change before and after the document is removed, the CPU 203 can appropriately detect whether the platen cover 102 has been opened and closed, that is, whether the document has been removed. The opening and closing detection position may thus be any position at which obtained output values change before and after a document is removed.

Before determining in S7202 that the certain period of time has elapsed since the process for detecting opening and closing started, the CPU 203 can newly receive a scanning job or a copying job from an external apparatus or can be instructed from the user to perform a process that requires copying or scanning. In this case, the CPU 203 may immediately proceed to S7219 and return the CIS 120 to the standby position 1106 to prepare for a next scanning operation.

As described above, the MFP 100 according to the present embodiment can reduce a load of the process for detecting a document compared to an example of the related art by performing the process for detecting a document using output values obtained during shading correction.

In addition, if a document on the contact glass 115 is detected, the MFP 100 according to the present embodiment performs the process for detecting opening and closing. In this case, it is possible to avoid notifying the user of an unremoved document if there is no document on the contact glass 115.

Second Embodiment

A case in which the process for detecting a document disclosed in the first embodiment is applied to copying will be described. Description of the same elements as in the first embodiment is omitted.

Copying includes a scanning step and a printing step in which printing is performed on the basis of image data read in the scanning step. In the present embodiment, the CPU 203 performs the process for detecting a document in the scanning step included in the copying. If a result of the process for detecting a document indicates that there is no document, the printing step is not performed after the scanning step. If a result of the process for detecting a document indicates that there is no document, on the other hand, the printing step is performed after notifying the user that there is no document on the contact glass 115.

This process will be described with reference to FIG. 7A. S7001 to S7011 are the same as in the first embodiment, and description thereof is omitted.

If Doc_on_flg is on, that is, if a result of a final determination indicates that there is a document, the CPU 203 transmits image data obtained in the scanning step to the printer control module 421 and performs the printing step based on the image data to obtain a copying result.

If Doc_on_flg is off, that is, if the result of the final determination indicates that there is no document, on the other hand, the CPU 203 temporarily saves the image data obtained in the scanning step to the RAM 204. The CPU 203 then notifies a part of the function management application 411 that manages copying that the user has specified copying without setting a document on the contact glass 115. Upon receiving the notification, the function management application 411 requests the job management application 412 to perform a job for displaying an alert using the interface control module 424. As a result, the UI 215 displays a screen for notifying the user that the user has specified copying without setting a document on the contact glass 115. The user can input, using the screen, an instruction to cancel the copying or an instruction to perform the copying in this state. That is, the user can check the notification and select the instruction to be input. If the result of the final determination indicates that there is no document, for example, the printing step may be canceled without displaying the screen for notifying the user that the user has specified copying without setting a document on the contact glass 115.

In this case, it is possible to avoid performing copying if there is no document on the contact glass 115.

The process for detecting opening and closing disclosed in the first embodiment may be applied to copying. In this case, the process for detecting opening and closing illustrated in FIGS. 7C and 7D is performed after the scanning step or the printing step ends.

Other Embodiments

The process for detecting a document and the process for detecting opening and closing according to the above embodiments are not limited to those described above. That is, the process for detecting a document and the process for detecting opening and closing may be performed in any ways. For example, the process for detecting a document may be performed by performing scanning again after scanning is performed and comparing obtained two pieces of data with each other. In addition, the process for detecting a document and the process for detecting opening and closing may be performed using sensors dedicated to detection of a document, the sensors being a plurality of reflective sensors that are not illustrated. In addition, the process for detecting opening and closing may be performed using a mechanism that is vertically movable with a motor or a solenoid actuator, which is not illustrated, and that sinks if the platen cover 102 is closed. In addition, in the process for detecting opening and closing, not opening and closing of the platen cover 102 but whether there is a document on the contact glass 115 may be detected.

Although the process for detecting opening and closing is not performed if the result of the final determination indicates that there is no document in the above embodiments, a condition under which the process for detecting opening and closing is not limited to this. The MFP 100 may perform the process for detecting opening and closing if the result of the final determination indicates that there is no document, but does not issue a notification if opening and closing of the platen cover 102 is not detected for a certain period of time.

Although it is determined as the final determination that there is a document on the contact glass 115 if Line_cnt is larger than the certain threshold (Line_cnt_on) in the above embodiments, a condition under which it is determined that there is a document on the contact glass 115 is not limited to this. For example, in order to reduce a processing load, it may be determined as the final determination that there is a document on the contact glass 115 if it is determined at least once in the process for detecting a document that there is a document.

The present invention can be implemented through a process in which a program for achieving one or more functions according to the above embodiments is supplied to a system or an apparatus through a network or one of various storage media and a computer (a CPU, a microprocessor unit (MPU), or the like) included in the system or the apparatus reads and executes the program. The program may be executed by a single computer or a plurality of computers that operate in cooperation with one another. All of the above-described processes need not be achieved by software, but some or all of the processes may be achieved by hardware such as an application-specific integrated circuit (ASIC). A single CPU need not perform all the processes, but a plurality of CPUs may operate together as necessary to perform the processes. In addition, a single CPU may perform one of the above-described processes, and a plurality of CPUs may operate together to perform the other processes.

It is possible to notify the user of an unremoved document and, if no document is set on a platen, avoid notifying the user of an unremoved document.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150326 filed Jul. 29, 2016, which is hereby incorporated by reference herein in its entirety.

What is claimed is:

1. A reading apparatus comprising:
a reader capable of reading a reading target, and capable of moving to at least a first position and a second position different from the first position;
a platen on which a document is set to be read by the reader located at the first position;
a first target read by the reader located at the first position if there is no document on the platen;
a second target read by the reader located at the second position, which is different from the first position, the second target being different from the first target;
at least one memory storing instructions;
at least one processor that, upon execution or the instructions, causes the at least one processor to operate as:
an obtaining unit configured to obtain an output corresponding to the reading target if the reader reads the reading target;
a determination unit configured to perform a determination process for determining whether the document is set on the platen by comparing a first output obtained if the reader located at the first position reads, as the reading target, the document or the first target and a second output obtained if the reader located at the second position reads, as the reading target, the second target; and
a notification unit configured to issue a notification relating to the document after the determination process is performed,
wherein, if a difference between a value corresponding to a third output, which is obtained as a result of reading performed by the reader located at a certain position at a first timing after the reading of the reading target on the platen performed by the reader, and a value corresponding to a fourth output, which is obtained by reading the reading target at the certain position using the reader at a second timing, which is different from the first timing, is equal to or smaller than a certain threshold, and if it is determined that the document is set on the platen, the notification is issued, and if the difference between the value corresponding to the third output and the value corresponding to the fourth output is not equal to or smaller than the certain threshold and if it is determined that the document is set on the platen, the notification is not issued.

2. The reading apparatus according to claim 1,
wherein, if a difference between a value corresponding to the first output and a value corresponding to the second output is greater than a threshold, it is determined that the document is set on the platen, and if the difference between the value corresponding to the first output and the value corresponding to the second output is less than or equal to the threshold, it is determined that the document is not set on the platen.

3. The reading apparatus according to claim 1,
wherein a value corresponding to the first output and a value corresponding to the second output each include a plurality of values, and
wherein, if a difference between a first value among the plurality of values corresponding to the first output and a second value among the plurality of values corresponding to the second output is less than or equal to a threshold or if a difference between a third value among the plurality of values corresponding to the first output and a fourth value among the plurality of values corresponding to the second output is less than or equal to a threshold, it is determined that the document is not set on the platen, and if the difference between the first value and the second value is greater than the threshold or if the difference between the third value and the fourth value is greater than the threshold, it is determined that the document is set on the platen.

4. The reading apparatus according to claim 1,
wherein a plurality of first outputs are obtained if the reader is moved and reads a plurality of lines in the reading target set on the platen, and
wherein, if a value corresponding to the first output whose difference from a value corresponding to the second output is less than or equal to a threshold does not continue for a certain number of lines, it is determined that the document is not set on the platen, and if the value corresponding to the first output whose difference from the value corresponding to the second output is less than or equal to the threshold continues for the certain number of lines, it is determined that the document is set on the platen.

5. The reading apparatus according to claim 1,
wherein the second target is a reference member for obtaining correction data used to correct the image data obtained by reading the reading target using the reader, and
wherein shading correction data for performing shading correction on the image data is obtained on the basis of the second output.

6. The reading apparatus according to claim 1,
wherein the second output is an average of output values obtained by reading a plurality of lines in the second target while the reader is being moved.

7. The reading apparatus according to claim 1,
wherein the first target is arranged on a platen cover included in the reading apparatus, and
wherein, if the platen cover is located at a closed position at which the platen cover covers the platen, the first target is located on the platen.

8. The reading apparatus according to claim 1, wherein execution of the instructions cause the at least one processor to operate as:
an image data obtaining unit configured to obtain image data corresponding to the reading target on the basis of the first output.

9. The reading apparatus according to claim 7, wherein execution of the instructions cause the at least one processor to operate as:
an opening and closing determination unit configured to determine whether the platen cover located at the closed position has moved after the reading of the reading target on the platen performed by the reader has been completed, and
wherein whether the platen cover located at the closed position has moved on the basis of a result of detection performed by an opening and closing detection unit for detecting a state of the platen cover.

10. The reading apparatus according to claim 7,
wherein, if it is determined that the document is set on the platen, whether the platen cover located at the closed position has moved is determined, and if it is not determined that the document is set on the platen, whether the platen cover located at the closed position has moved is not determined.

11. The reading apparatus according to claim 8,
wherein the notification unit displays, on a display, a screen for indicating that the document read by the reader has not been removed from the platen.

12. The reading apparatus according to claim 1, wherein execution of the instructions cause the at least one processor to operate as:
a printing unit configured to cause a printer to perform printing based on the image data generated by reading the reading target using the reader.

13. The reading apparatus according to claim 1, wherein execution of the instructions cause the at least one processor to operate as:
a reception unit configured to receive, from an external apparatus, a scanning job for causing the reader to read the reading target on the platen; and
a transmission unit configured to transmit image data generated on the basis of the scanning job to the external apparatus that has transmitted the scanning job received by the reception unit.

14. The reading apparatus according to claim 1,
wherein the reader includes a contact image sensor.

15. A reading apparatus comprising:
a reader capable of reading a reading target, and capable of moving to at least a first position and a second position different from the first position;
a platen on which a document is set to be read by the reader located at the first position;
a first target read by the reader located at the first position if there is no document on the platen;
a second target read by the reader located at the second position, which is different from the first position, the second target being different from the first target; and
at least one memory storing instructions;
at least one processor that, upon execution of the instructions, causes the at least one processor to operate as:
an obtaining unit configured to obtain an output corresponding to the reading target if the reader reads the reading target; and
a determination unit configured to perform a determination process for determining whether the document is set on the platen by comparing a first output obtained if the reader located at the first position reads, as the reading target, the document or the first target and a second output obtained if the reader located at the second position reads, as the reading target, the second target,
wherein a value corresponding to the first output and a value corresponding to the second output each include a plurality of values, and
wherein, if a difference between a first value among the plurality of values corresponding to the first output and a second value among the plurality of values corresponding to the second output is less than or equal to a threshold or if a difference between a third value among the plurality of values corresponding to the first output and a fourth value among the plurality of values corresponding to the second output is less than or equal to a threshold, it is determined that the document is not set on the platen, and if the difference between the first value and the second value is greater than the threshold or if the difference between the third value and the fourth value is greater than the threshold, it is determined that the document is set on the platen.

16. A reading apparatus comprising:
a reader capable of reading a reading target, and capable of moving to at least a first position and a second position different from the first position;
a platen on which a document is set to be read by the reader located at the first position;
a first target read by the reader located at the first position if there is no document on the platen;
a second target read by the reader located at the second position, which is different from the first position, the second target being different from the first target; and
at least one memory storing instructions;
at least one processor that, upon execution of the instructions, causes the at least one processor to operate as:
an obtaining unit configured to obtain an output corresponding to the reading target if the reader reads the reading target; and
a determination unit configured to perform a determination process for determining whether the document is set on the platen by comparing a first output obtained if the reader located at the first position reads, as the reading target, the document or the first target and a second output obtained if the reader located at the second position reads, as the reading target, the second target,
wherein a plurality of first outputs are obtained if the reader is moved and reads a plurality of lines in the reading target set on the platen, and
wherein, if a value corresponding to the first output whose difference from a value corresponding to the second output is less than or equal to a threshold does not continue for a certain number of lines, it is determined that the document is not set on the platen, and if the value corresponding to the first output whose difference from the value corresponding to the second output is less than or equal to the threshold continues for the certain number of lines, it is determined that the document is set on the platen.

17. A reading apparatus comprising:
a reader capable of reading a reading target, and capable of moving to at least a first position and a second position different from the first position;
a platen on which a document is set to be read by the reader located at the first position;
a first target read by the reader located at the first position if there is no document on the platen;
a second target read by the reader located at the second position, which is different from the first position, the second target being different from the first target; and
at least one memory storing instructions;
at least one processor that, upon execution of the instructions, causes the at least one processor to operate as:
an obtaining unit configured to obtain an output corresponding to the reading target if the reader reads the reading target;
a determination unit configured to perform a determination process for determining whether the document is set on the platen by comparing a first output obtained if the reader located at the first position reads, as the reading target, the document or the first target and a second output obtained if the reader located at the second position reads, as the reading target, the second target;
a cover determination unit configured to determine whether a platen cover located at a closed position at which the platen cover covers the platen has moved after the reading of the reading target performed by the reader has been completed; and
a notification unit configured to issue a notification relating to the document after the determination process is performed,
wherein, if it is determined that the document is set on the platen and that the platen cover located at the closed position has not moved, the notification is issued, and if it is determined that the document is set on the platen and that the platen cover located at the closed position has moved, or if it is determined that the document is not set on the platen, the notification is not issued,
wherein whether the platen cover located at the closed position has moved is determined at a first timing after the reading of the reading target on the platen performed by the reader has been completed on the basis of a third output, which is obtained as a result of reading performed by the reader located at a certain position, and a fourth output, which is obtained by reading the reading target located at the certain position using the reader at a second timing, which is different from the first timing,
wherein a value corresponding to the third output and a value corresponding to the fourth output each include a plurality of values, and
wherein, if a difference between a fifth value among the plurality of values corresponding to the third output and a sixth value among the plurality of values corresponding to the fourth output is less than or equal to a threshold or if a difference between a seventh value, which is different from the fifth value, among the plurality of values corresponding to the third output and an eighth value, which is different from the sixth value, among the plurality of values corresponding to the fourth output is less than or equal to a threshold, it is determined that the platen cover located at the closed position has not moved, and if the difference between the fifth value and the sixth value is greater than the threshold or if the difference between the seventh value and the eighth value is greater than the certain threshold, it is determined that the platen cover located at the closed position has moved.

* * * * *